(12) United States Patent
Mori et al.

(10) Patent No.: US 10,120,321 B2
(45) Date of Patent: Nov. 6, 2018

(54) POWER TRANSMISSION APPARATUS AND IMAGE FORMING APPARATUS COMPRISING THE SAME

(71) Applicant: CANON KABUSHIKI KAISHA, Tokyo (JP)

(72) Inventors: Yuri Mori, Tokyo (JP); Seiji Hara, Suntou-gun (JP); Mineto Yagyu, Hachioji (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/622,376

(22) Filed: Jun. 14, 2017

(65) Prior Publication Data
US 2017/0371290 A1   Dec. 28, 2017

(30) Foreign Application Priority Data

Jun. 24, 2016 (JP) .................................. 2016-125913

(51) Int. Cl.
| | | |
|---|---|---|
| G03G 15/00 | (2006.01) | |
| F16G 1/00 | (2006.01) | |
| F16H 7/02 | (2006.01) | |
| F16H 55/36 | (2006.01) | |
| G03G 15/02 | (2006.01) | |

(52) U.S. Cl.
CPC ............. *G03G 15/757* (2013.01); *F16G 1/00* (2013.01); *F16H 7/02* (2013.01); *F16H 55/36* (2013.01); *G03G 15/02* (2013.01); *G03G 15/80* (2013.01)

(58) Field of Classification Search
CPC ........... G03G 15/757; F16H 7/02; F16H 7/18; F16H 55/38; B65G 54/02
See application file for complete search history.

(56) References Cited

U.S. PATENT DOCUMENTS

| | | | | |
|---|---|---|---|---|
| 5,411,444 A | * | 5/1995 | Nakamura ................. | F16H 7/02 474/148 |
| 2015/0147093 A1 | * | 5/2015 | Mori ........................ | F16H 55/38 399/167 |
| 2015/0268614 A1 | * | 9/2015 | Kiyama .................... | F16H 7/18 399/167 |
| 2015/0277338 A1 | * | 10/2015 | Hamada ............... | G03G 15/757 399/167 |
| 2015/0277339 A1 | * | 10/2015 | Miyazawa ........... | G03G 15/757 399/167 |

FOREIGN PATENT DOCUMENTS

JP            H08-146783 A            6/1996

* cited by examiner

*Primary Examiner* — Ryan Walsh
(74) *Attorney, Agent, or Firm* — Fitzpatrick, Cella, Harper & Scinto

(57) ABSTRACT

A power transmission apparatus includes a first pulley and a second pulley. A belt is extended around them. A supply unit supplies a voltage such that the first pulley and the belt are electrostatically attracted and that the second pulley and the belt are electrostatically attracted. The belt includes a conductor layer. At least one pulley includes a first electrode to which a first voltage is applied and a second electrode that is insulated from the first electrode and to which a second voltage is applied. An insulating layer or a dielectric layer is arranged between the conductor layer of the belt and the first electrode of the at least one pulley and an insulating layer or a dielectric layer is arranged between the conductor layer of the belt and the second electrode of the at least one pulley.

20 Claims, 18 Drawing Sheets

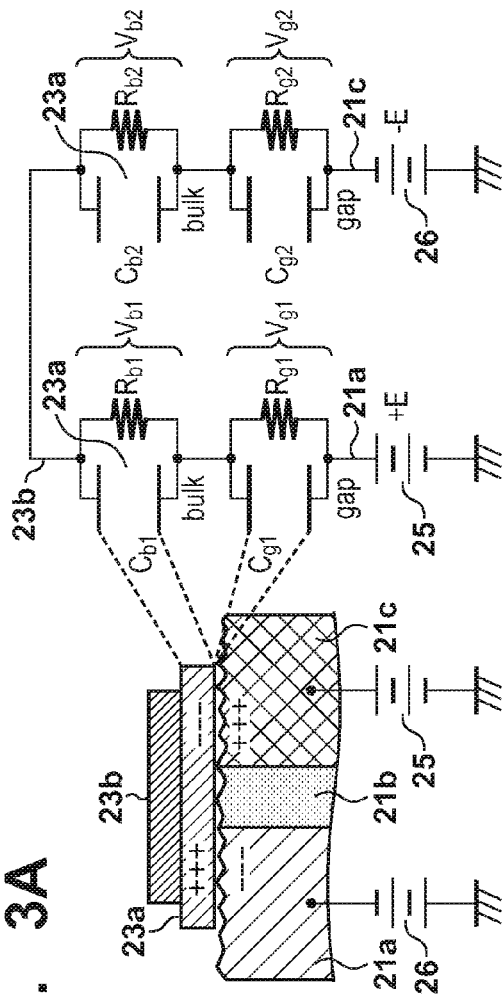
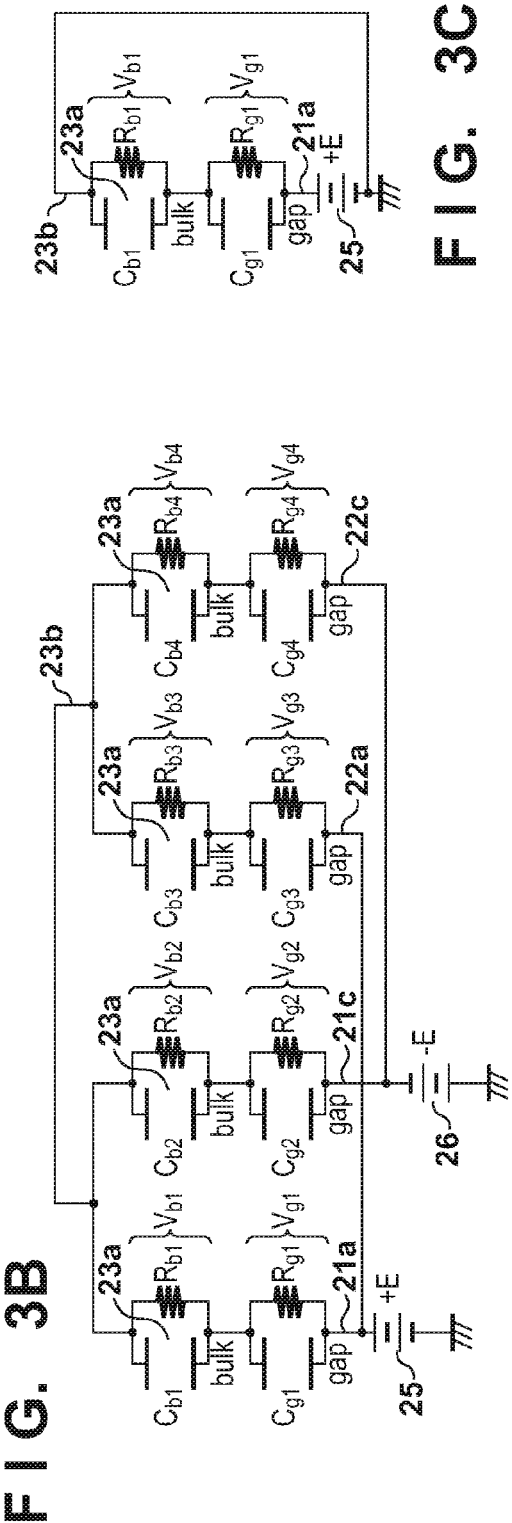
FIG. 3A
FIG. 3B
FIG. 3C

POWER TRANSMISSION APPARATUS AND IMAGE FORMING APPARATUS COMPRISING THE SAME

BACKGROUND OF THE INVENTION

Field of the Invention

The present invention relates to a power transmission apparatus and an image forming apparatus comprising the same.

Description of the Related Art

Image forming apparatuses have a plurality of rotating bodies such as image carriers and intermediate transfer bodies that rotate by being driven by a motor. Although it is common that power that the motor generates is transmitted via a gear, something in place of a gear or a gear as well as a belt may be employed. Japanese Patent Laid-Open No. H8-146783 proposes causing an electrostatic attraction force to act between a driving roller and an intermediate transfer belt and transmitting the power of the driving roller to the intermediate transfer belt.

It is necessary that a potential difference be produced by causing the belt to touch a conductive brush in order to cause an electrostatic attraction between a driving pulley and the belt in Japanese Patent Laid-Open No. H8-146783. Accordingly, a chafing sound is produced between the belt and the conductive brush.

SUMMARY OF THE INVENTION

Accordingly, the present invention reduces a chafing sound while transmitting power that a driving source generates to a pulley, belt, or the like with good efficiency.

The present invention provides a power transmission apparatus comprising the following elements. A first pulley is rotationally driven by a driving unit. A second pulley. A belt is extended around the first pulley and the second pulley. A supply unit is configured to supply a voltage such that the first pulley and the belt are electrostatically attracted to each other and that the second pulley and the belt are electrostatically attracted to each other. The belt includes a conductor layer. At least one pulley among the first pulley and the second pulley includes a first electrode to which a first voltage is applied and a second electrode that is insulated from the first electrode and to which a second voltage is applied. An insulating layer or a dielectric layer is arranged between the conductor layer of the belt and the first electrode of the at least one pulley. Another insulating layer or another dielectric layer is arranged between the conductor layer of the belt and the second electrode of the at least one pulley.

Further features of the present invention will become apparent from the following description of exemplary embodiments (with reference to the attached drawings).

BRIEF DESCRIPTION OF THE DRAWINGS

FIGS. 3A-3C are views for describing equivalent circuits of the power transmission apparatus;

DESCRIPTION OF THE EMBODIMENTS

First Embodiment

In accordance with a first aspect, in addition to between a belt and a driving pulley, an electrostatic attraction force acts between the belt and the driven pulley. Thus, it becomes possible to transmit power that a driving source generates to the driven pulley with good efficiency. In accordance with a second aspect, by design of a configuration of a pulley and a belt, it becomes possible to reduce a chafing sound of the belt. Both the first aspect and the second aspect may be employed in a power transmission apparatus or one may be employed in the power transmission apparatus.

Figure 1:
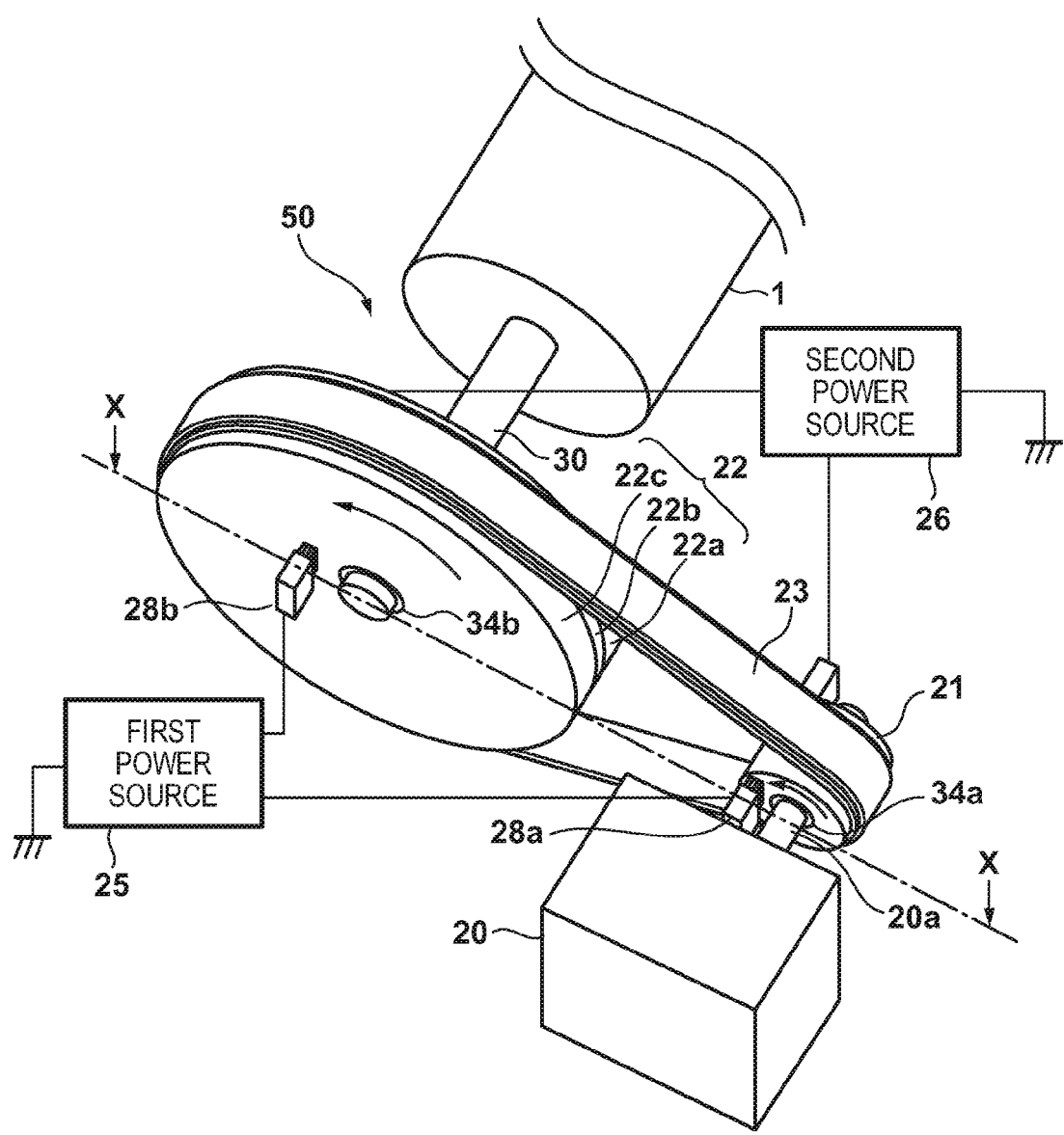
FIG. 1 is a perspective view of a power transmission apparatus according to a first embodiment.
Figure 2:
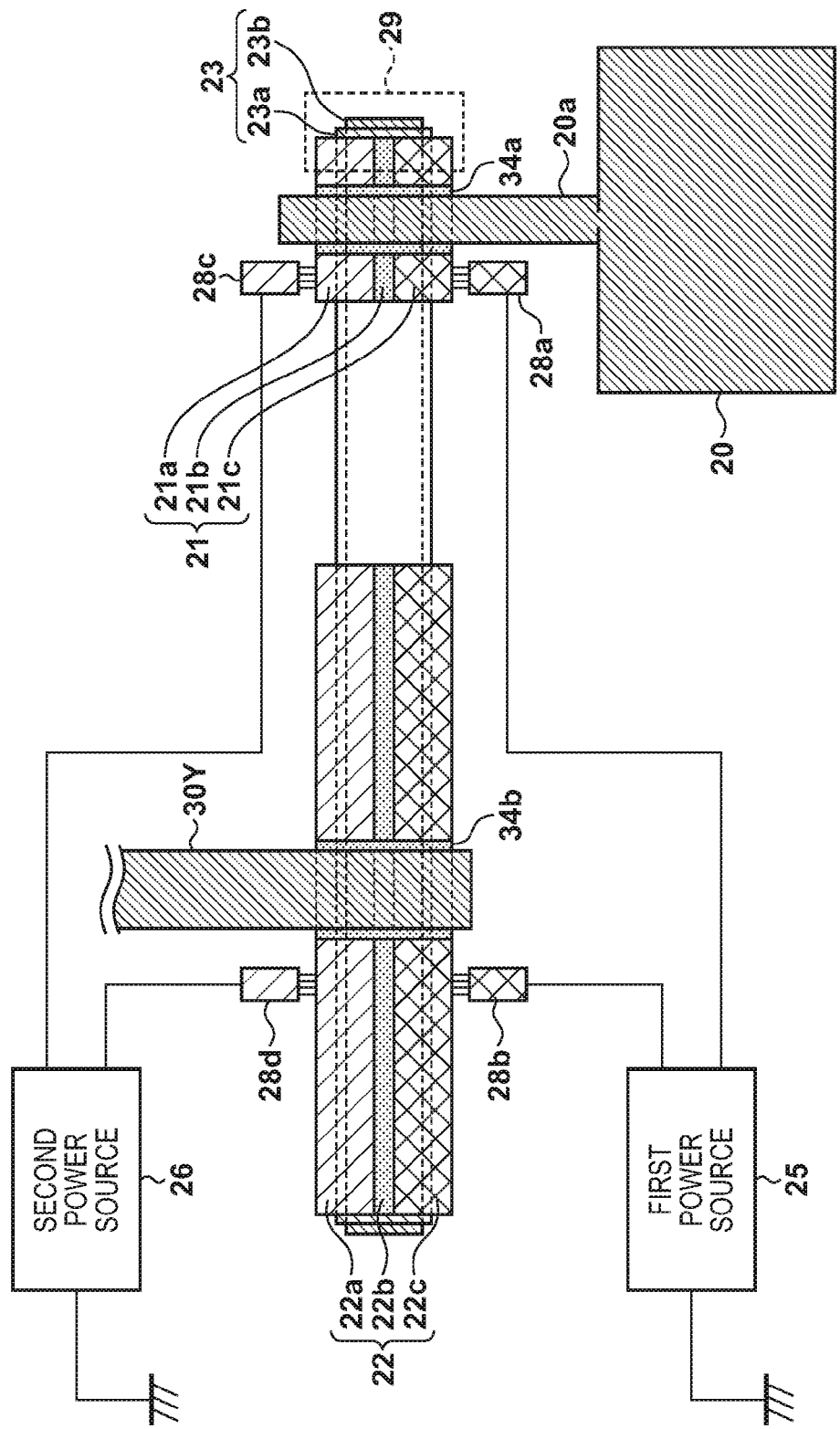
FIG. 2 is a view illustrating an X-X cross-section.

FIG. 1 and FIG. 2 illustrate a power transmission apparatus 50. A belt 23 is an endless belt stretched between a driving pulley 21 and a driven pulley 22. A motor 20 is a driving source that generates a driving force (power). The driving pulley 21 is fixed via an insulating member 34a on an output shaft 20a of the motor 20. The power that the motor 20 generates is transmitted to the driving pulley 21 via the output shaft 20a. The power is transmitted to the belt 23 by a frictional force on a contact surface between the driving pulley 21 and the belt 23 when the driving pulley 21 is powered and rotates. The power is transmitted to the driven pulley 22 by a frictional force on a contact surface between the belt 23 and the driven pulley 22 when the power is transmitted to the belt 23 and the belt 23 rotates. A photosensitive drum 1 which is a driven body is fixed on a rotating shaft 30 of the driven pulley 22 and the power of the driven pulley 22 is transmitted to the photosensitive drum 1 thereby. In other words, the photosensitive drum 1 also makes one rotation when the driven pulley 22 makes one rotation. Note, an insulating member 34b is arranged between the driven pulley 22 and the rotating shaft 30.

The driven body is a fixing roller of a fixing apparatus or a driving roller that drives the photosensitive drum 1 and the intermediate transfer belt in a case when the power transmission apparatus 50 is applied to the image forming apparatus. However, these are nothing more than examples, and it is possible to employ the driven body as long as it is a rotating body that is rotated by power supplied by the driven pulley 22.

As FIG. 2 illustrates, a first power source 25 generates a first voltage and applies the first voltage via a conductive brush 28a to a conductor unit 21c forming a first side surface of the driving pulley 21. A second power source 26 generates a second voltage and applies the second voltage via a conductive brush 28c to a conductor unit 21a forming a second side surface of the driving pulley 21. The first power source 25 and the second power source 26 form a power source apparatus. An insulating layer 21b is arranged between a conductor unit 21c and a conductor unit 21a. The first voltage and the second voltage are different and a potential difference occurs between the conductor unit 21c and the conductor unit 21a. An electrostatic attraction force is produced between the driving pulley 21 and the belt 23 due to this potential difference.

The first power source 25 applies the first voltage via a conductive brush 28b to a conductor unit 22c forming a first side surface of the driven pulley 22. The second power source 26 via the conductive brush 28d applies the second voltage to the conductor unit 22a forming a second side surface of the driven pulley 22. An insulating layer 22b is arranged between a conductor unit 22c and a conductor unit 22a. The first voltage and the second voltage are different and a potential difference occurs between the conductor unit 22c and the conductor unit 22a. An electrostatic attraction force is produced between the driven pulley 22 and the belt 23 due to this potential difference. Note, the first voltage and the second voltage are both direct-current voltages.

The conductor unit 21c, the insulating layer 21b, and the conductor unit 21a forming the driving pulley 21 are disc members forming a donut shape or a cylindrical shape. A cylindrical hole is open in the center of the conductor unit 21c, the insulating layer 21b, and the conductor unit 21a and the output shaft 20a of the motor 20 is coupled to this portion via the insulating member 34a. For convenience of the description, the radius and the width of the driving pulley 21 are both assumed to be 10 mm. The width of the conductor unit 21a and the width of the conductor unit 21c are each assumed to be 4.5 mm. The width of the insulating layer 21b is assumed to be 1 mm. These numerical values are nothing more than one example. Although several numerical values appear in the description below for convenience of description, all are nothing more than examples.

The conductor unit 22c, the insulating layer 22b, and the conductor unit 22a forming the driven pulley 22 are disc members forming a donut shape or a cylindrical shape. A cylindrical shaped hole is open in the center of the conductor unit 22c, the insulating layer 22b, and the conductor unit 22a and the rotating shaft 30 is coupled to this portion via the insulating member 34b. It is assumed that the radius of the driven pulley 22 is 40 mm and the width is 10 mm. The width of the conductor unit 22a and the width of the conductor unit 22c are each assumed to be 4.5 mm. The width of the insulating layer 22b is assumed to be 1 mm.

As FIG. 2 illustrates, the belt 23 has a dielectric layer 23a on a side (inner circumferential surface side) contacting with the driving pulley 21 and the driven pulley 22. Furthermore, a conductor unit 23b is arranged on the dielectric layer 23a (outer circumferential surface side). The dielectric layer 23a may be configured by a polyimide resin material in which conductive carbon is dispersed for example. A volume resistivity of the dielectric layer 23a is adjusted to greater than or equal to 1E+9 [Ω·m] and less than or equal to 1E+14 [Ω·m] for example. The thickness of the dielectric layer 23a is approximately 70 μm. The width of the dielectric layer 23a is approximately 10 mm. This width is the same as the width of the driving pulley 21 and the width of the driven pulley 22. The conductor unit 23b may be formed by sputtering by using a material such as nickel (Ni) and the thickness is approximately 100 nm. The width of the conductor unit 23b of the belt 23 is narrower than the width of the dielectric layer 23a as FIG. 2 illustrates. A conductor such as a metal is exposed on a side edge of the driving pulley 21 or the driven pulley 22. Accordingly, discharge is suppressed by making a creeping distance between the respective surfaces of the driving pulley 21 or the driven pulley 22 and the conductor unit 23b of the belt 23 larger. The winding angle of the belt 23 and the driving pulley 21 is 120°. The winding angle of the belt 23 and the driven pulley 22 is 240°.

By configuring as described above, an electrostatic attraction force is produced between the driven pulley 22 and the belt 23 and between the driving pulley 21 and the belt 23, and a frictional force which contributes to the transmission of the power increases. In other words, the efficacy of the transmission of the power improves. Note, the initial tension imparted to the belt 23 may be reduced and is 0.5 kgf here.

Electrostatic Attraction Force

FIG. 3A illustrates a cross-section of the driving pulley 21 and the belt 23 in a dashed line box 29 illustrated in FIG. 2 and an equivalent circuit thereof. FIG. 3B is an equivalent circuit diagram illustrating electrical properties of the power transmission apparatus 50. As FIG. 3A illustrates, a minute unevenness exists on the respective contact surfaces of the driving pulley 21 and the belt 23. For this reason, a minute gap is formed between the driving pulley 21 and the belt 23. Such a contacting state is represented by an equivalent circuit as FIG. 3A illustrates electrically. Here, Cb1 indicates a static capacitance of the dielectric layer 23a. Rb1 indicates a resistance of the dielectric layer 23a. Cg1 indicates a static capacitance of the gap formed by the conductor unit 21a and the belt 23 of the driving pulley 21. Rg1 indicates a contact resistance of the conductor unit 21a and the belt 23 of the driving pulley 21. Here, Cb2 indicates a static capacitance of the dielectric layer 23a. Rb2 indicates a resistance of the dielectric layer 23a. Cg2 indicates a static capacitance of the gap formed by the conductor unit 21c and the belt 23 of the driving pulley 21. Rg2 indicates a contact resistance of the conductor unit 21c of the driving pulley 21 and the belt 23. Cb3 indicates a static capacitance of the dielectric layer 23a relating to the driven pulley 22. Rb3 indicates a resistance of the dielectric layer 23a. Cg3 indicates a static capacitance of the gap formed by the conductor unit 22a and the belt 23 of the driven pulley 22. Rg3 indicates a contact resistance of the conductor unit 22a and the belt 23 of the driven pulley 22. Here, Cb4 indicates a static capacitance of the dielectric layer 23a. Rb4 indicates a resistance of the dielectric layer 23a. Cg4 indicates a static capacitance of the gap formed by the conductor unit 22c and the belt 23 of the driven pulley 22. Rg4 indicates a contact resistance of the conductor unit 22c and the belt 23 of the driven pulley 22.

A voltage is applied between the conductor unit 21a and the conductor unit 21c of the driving pulley 21, and a large voltage drop occurs when a current flows. This is due to a contact resistance of a point of contact between the conductor unit 21a and the dielectric layer 23a and a contact resistance of a point of contact between a conductor unit 21c and the dielectric layer 23a. The voltage drops of these are Vg1 and Vg2 respectively. Vb1 and Vb2 indicate voltage drops due to a resistance component of the dielectric layer 23a. Voltage drops relating to the driven pulley 22 are Vb3 and Vb4 and Vg3 and Vg4. As FIG. 3A illustrates, a positive/negative charge is induced on each contact surface because a gap exists between the contact surface of the driving pulley 21 and the contact surface of the dielectric layer 23a of the belt 23. A large attraction force occurs between the contact surface of the driving pulley 21 and the contact surface of the belt 23 because a tremendously large electric field occurs in a small gap. This electrostatic attraction force is a Johnsen-Rahbek force. Generally, the Johnsen-Rahbek force becomes a large force in a case when a volume resistivity of the dielectric layer 23a is greater than or equal to 1E+9 [Ω·m] and less than or equal to 1E+14 [Ω·m].

Following, a method of calculating an electrostatic attraction force in the equivalent circuit that FIG. 3A illustrates is described. In FIG. 3A, a potential of the conductor unit 23b of the belt 23 becomes 0V when the first power source 25 generates +E [V] and applies it to the conductor unit 21c and the second power source 26 generates −E [V] and applies it to the conductor unit 21a. Accordingly, the equivalent circuit in the boundary of the conductor unit 21a and the belt 23 of the driving pulley 21 is the circuit that FIG. 3C illustrates. In the equivalent circuit that FIG. 3C illustrates, an electrostatic attraction force P per unit area and a charge per unit area Qg1 induced on the contact surface between the conductor unit 21a and the dielectric layer 23a of the belt 23 is expressed by the following equation.

$$P = \frac{Q_{g1}^2}{2\varepsilon_0} \quad (1)$$

$$Q_{g1} = \frac{C_{g1}R_{g1}}{R_{g1} + R_{b1}} E \cdot \left\{1 - \exp\left(-\frac{t}{\tau}\right)\right\} \quad (2)$$

ε0 is the dielectric constant of air. τ is a time constant of the equivalent circuit illustrated in FIG. 3A. t is time. The electrostatic attraction force P per unit area when charge Qg1 stored in a static capacitance Cg1 is stable over an elapsed time (t=∞) from Equation (1) and Equation (2) is described by Equation (3).

$$P = \frac{1}{2\varepsilon_0} \cdot \left(\frac{C_{g1}R_{g1}}{R_{g1} + R_{b1}} E\right)^2 \quad (3)$$

From Equation (3), it can be seen that the electrostatic attraction force P is determined by the applied voltage E, the static capacitance of the gap Cg1, the contact resistance Rg1, and the volume resistivity Rb1 of the dielectric layer 23a of the belt 23. Equation (3) represents the electrostatic attraction force P on the contact surface of the conductor unit 21a of the driving pulley 21 and the dielectric layer 23a of the belt 23. However, the electrostatic attraction force also is produced on the contact surface of the conductor unit 21c of the driving pulley 21 and the dielectric layer 23a of the belt 23 according to the same principle. The electrostatic attraction force that is produced on the contact surface of the conductor unit 22a of the driven pulley 22 and the dielectric layer 23a of the belt 23 is calculated based on Equation (3). Similarly, the electrostatic attraction force that is produced on the contact surface of the conductor unit 22c of the driven pulley 22 and the dielectric layer 23a of the belt 23 is calculated based on Equation (3).

Transmission of Power

Based on the configuration of the power transmission apparatus 50 and the electrostatic attraction force that is produced in the power transmission apparatus 50 as described thus far, power that can be transmitted in the power transmission apparatus 50 is described. When the driving pulley 21 rotates, a difference in belt tension occurring at the lower portion and belt tension occurring at the upper portion of the belt 23 occurs, and the power is transmitted to the driven pulley 22 by this tension difference. The power that can be transmitted is the same as the tension difference. In such a power transmitting method, the power that can be transmitted, specifically the tension difference that can be produced, depends on the maximum frictional force that can be produced between the pulley and the belt. Generally, a power F1 that can be transmitted is represented by the following Equation (4) from Euler's formula in a drive transmission method that does not use an electrostatic attraction force.

$$F_1 = \frac{e^{\mu\theta} - 1}{e^{\mu\theta} + 1}\left(\frac{T}{\sin\frac{\theta}{2}}\right) \quad (4)$$

T is the tension that is exerted on the belt. θ is a winding angle in relation to the pulley of the belt. μ is the friction coefficient between the belt and the pulley. A power F2 that can be transmitted in a case when electrostatic attraction force is added is represented by the following Equation (5).

$$F_2 = \frac{e^{\mu\theta} - 1}{e^{\mu\theta} + 1}\left(\frac{T}{\sin\frac{\theta}{2}} + 2 \cdot r \cdot b \cdot P\right) \quad (5)$$

Here, P is the electrostatic attraction force per unit area produced between the pulley and the belt. r is the radius of the pulley. b is the width of the belt. It can be seen from Equation (5) that the power that the power transmission apparatus 50 can transmit increases by producing an electrostatic attraction force. Also, the power that can be transmitted of the power transmission apparatus 50 is represented by Equation (6) which is obtained by substituting Equation (3) into Equation (5).

$$F_2 = \frac{e^{\mu\theta} - 1}{e^{\mu\theta} + 1}\left(\frac{T}{\sin\frac{\theta}{2}} + \frac{r \cdot b}{\varepsilon_0} \cdot \left(\frac{C_{g1}R_{g1}}{R_{g1} + R_{b1}} E\right)^2\right) \quad (6)$$

It can be seen from Equation (6) that the power that the power transmission apparatus 50 can transmit is determined by the applied voltage E, the static capacitance of the gap Cg1, the contact resistance Rg1, and the volume resistivity of the dielectric layer 23a of the belt 23 Rb1, similarly to the electrostatic attraction force. Following, description is given regarding the power that the power transmission apparatus 50 can transmit in relation to the applied voltage based on Equation (6). Firstly, the power that can be transmitted of the power transmission apparatus 50 becomes larger in proportion to the square of the applied voltage E as Equation (6) indicates in a case when the applied voltage E is caused to change.

It is necessary to leave leeway for the values of the voltages that the first power source 25 and the second power source 26 produce in order to reduce slipping. In particular, the voltages are determined without an electrostatic attraction force so that the pulley most likely to slip among the plurality of pulleys does not slip. Here the driving pulley 21 for which the winding angle of the belt 23 is the smallest is the pulley that is most likely to slip. The voltages are set so that the power F2 is larger than the numerical value obtained by multiplying a factor of safety with the value obtained by dividing the rotational load applied to the rotating shaft 30 of the driven pulley 22 by the radius of the driven pulley 22.

The configuration of the power transmission apparatus 50 is not limited to the configuration described up until this point, and the technical concept of the present invention can be applied even with another configuration. Specifically, a dielectric layer may be arranged on the conductor unit 23b of the belt 23. There may be more conductor units or more insulating layers arranged on a pulley. A conductor unit arranged on a pulley may be formed by sputtering. The belt 23 is not limited to a flat belt and may be a V-belt or a V-ribbed belt that transmits friction with the pulleys. The pulley is changed to a pulley having a flange and a groove from a drum type pulley in accordance with the type of the belt 23.

As described above, an electrostatic attraction force acts between the belt 23 and the driven pulley 22 in addition to between the belt 23 and the driving pulley 21 in the first embodiment. Thus, it becomes possible to transmit power that the motor 20 generates to the driven pulley 22 with good efficiency. In other words, slippage is suppressed between the belt and the pulley and the driving force is transmitted to the driven body stably. It becomes possible to employ the power transmission apparatus 50 in place of a transmission mechanism that employs gears because the power that can be transmitted increases. Vibration and mechanical noise are significantly reduced. Furthermore, it is not necessary to set the initial tension of the belt to an excessive value because the frictional force increases by the electrostatic attraction force. As a result, change in the accuracy (a change in the parallelism of a support shaft of a pulley) due to long term usage is suppressed, and durability of the power transmission apparatus 50 improves.

Also, at least one pulley among the driving pulley 21 and the driven pulley 22 has two conductor units and an insulating layer (insulating member) arranged therebetween. As FIGS. 1 and 2 describe, the at least one pulley has a first electrode (the conductor units 21c and 22c) to which a first voltage is applied and a second electrode (the conductor units 21a and 22a), insulated from the first electrode, and to which a second voltage is applied. The belt 23 is configured by stacking the dielectric layer 23a and the conductor unit 23b which is the conductor layer. A voltage for causing an electrostatic attraction force to be produced between the at least one pulley and the belt 23 is supplied to the at least one pulley from the first power source 25 or the second power source 26. By this, a potential difference is produced in the two adjacent conductor units via the insulating layer in the pulley and a potential difference also is produced between the two conductor units of the pulley and the conductor unit of the belt. As a result, an electrostatic attraction force between the pulley and the belt is produced. By employing such a configuration, a circuit and a part (such as a conductive brush) for grounding the belt become unnecessary. A chafing sound is not produced because a conductive brush that chafes with the belt does not exist.

Second Embodiment

In a second embodiment, the configuration of the belt 23 of the power transmission apparatus 50 differs from the first embodiment. For this reason, description is given centering on the points of difference hereinafter. The same reference numerals are given to configuration elements that are the same or to configuration elements that are similar to those already described, and description of these is omitted.

Figure 4:
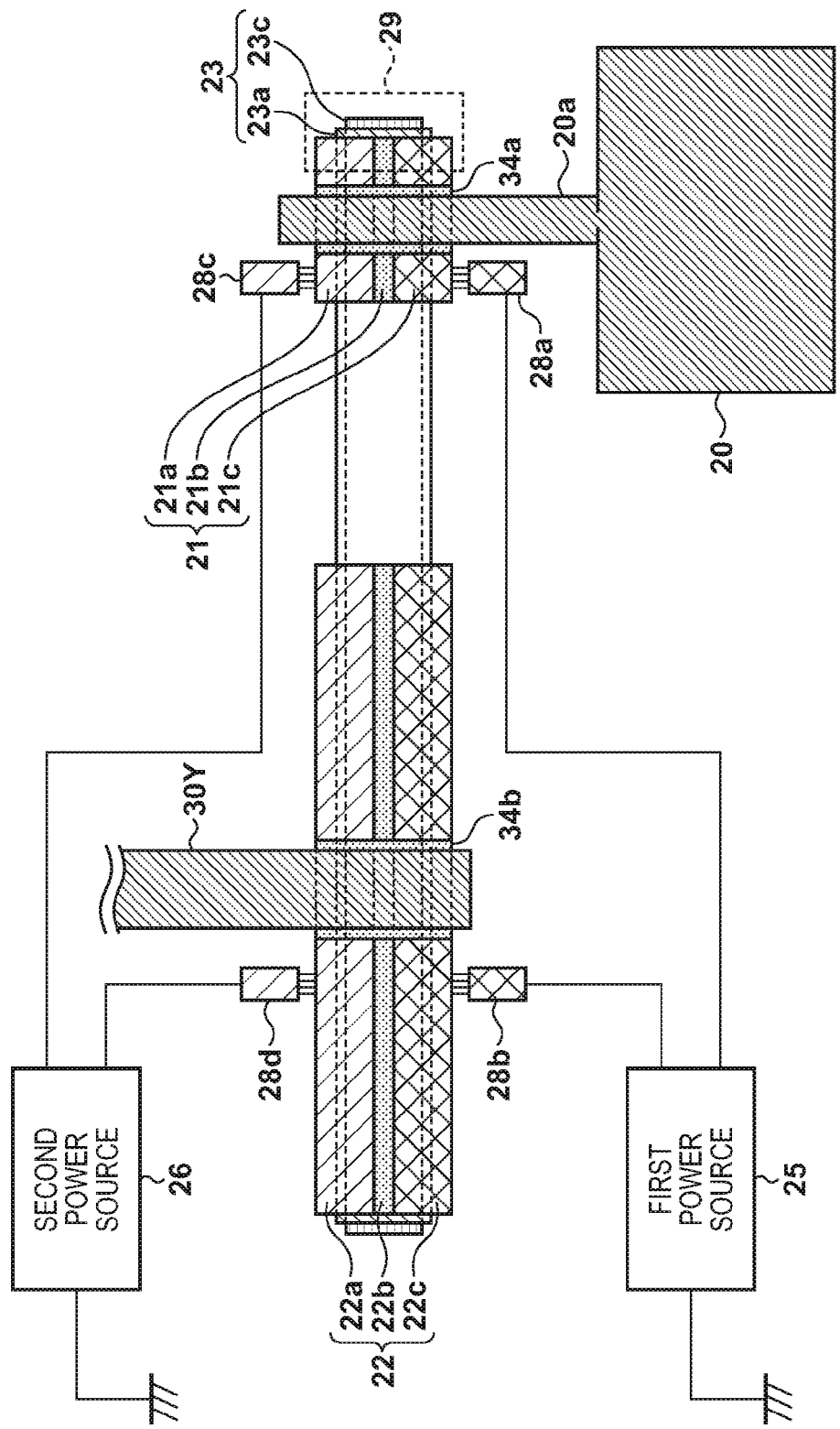
FIG. 4 is a cross-sectional view of the power transmission apparatus of a second embodiment.
Figure 5:
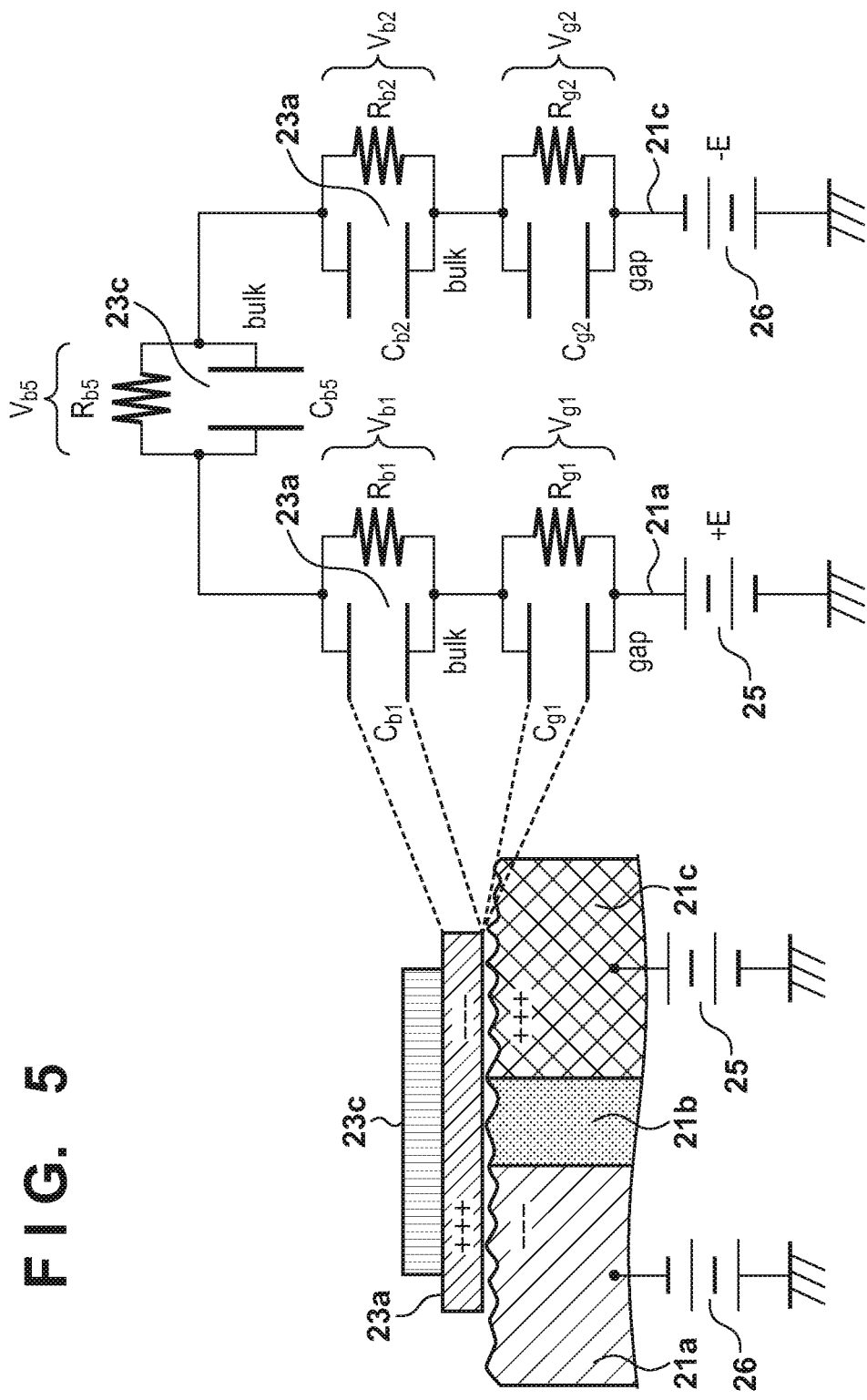
FIG. 5 is a view for describing an equivalent circuit of the power transmission apparatus.

FIG. 4 is a schematic cross-sectional view of the power transmission apparatus 50 according to the second embodiment. FIG. 5 illustrates a cross-section of the driving pulley 21 and the belt 23 in the dashed line box 29 illustrated in FIG. 4 and an equivalent circuit thereof. The conductor unit 23b is stacked on the outer circumferential surface of the dielectric layer 23a of the belt 23 as illustrated in FIG. 2 and FIG. 3A in the first embodiment. In contrast to this, a low-resistance layer 23c is arranged on the outer circumferential surface of the dielectric layer 23a of the belt 23 as illustrated in FIG. 4 and FIG. 5 in the second embodiment. The equivalent circuit indicating electrical properties of the power transmission apparatus 50 is also changed by employing the low-resistance layer 23c in place of the conductor unit 23b. The low-resistance layer 23c may be configured by a polyimide resin material in which conductive carbon is dispersed for example. The volume resistivity of the low-resistance layer 23c is less than the volume resistivity of the dielectric layer 23a and is greater than or equal to 1E+2 [Ω·m] and less than or equal to 1E+8 [Ω·m]. The thickness of the low-resistance layer 23c is approximately 10 μm.

Electrostatic Attraction Force

Cb5 is the static capacitance of the low-resistance layer 23c in the equivalent circuit that FIG. 5 illustrates. Rb5 is the resistance of the low-resistance layer 23c. The electrostatic attraction force P per unit area is represented by Equation (7).

$$P = \frac{Q_{g1}^2}{2\varepsilon_0} \tag{7}$$

The charge per unit area Qg1 induced on both the contact surface of the conductor unit 21a side of the driving pulley 21 and the contact surface of the dielectric layer 23a side of the belt 23 is represented by Equation (8)

$$Q_{g1} = \frac{C_{g1} R_{g1}}{R_{g1} + R_{b1} + R_{b5} + R_{b2} + R_{g2}} 2E \tag{8}$$

Equation (9) is obtained when Equation (8) is substituted into Equation (7).

$$P = \frac{1}{2\varepsilon_0} \cdot \left( \frac{C_{g1} R_{g1}}{R_{g1} + R_{b1} + R_{b5} + R_{b2} + R_{g2}} 2E \right)^2 \tag{9}$$

In other words, the electrostatic attraction force P is determined by the applied voltage E, the static capacitance Cg1 of the gap, the contact resistances Rg1 and Rg2, the volume resistivities Rb1 and Rb2 of the dielectric layer 23a of the belt 23, and the volume resistivity Rb5 of the low-resistance layer 23c of the belt 23. The volume resistivity of the low-resistance layer 23c of the belt 23 may be reduced in order to enlarge the electrostatic attraction force P. Alternatively, the thickness of the conductor unit 21a, the conductor unit 21c, and the insulating layer 21b may be made thinner and the number of the conductor unit 21a, the conductor unit 21c, and the insulating layer 21b may be increased.

In the foregoing, although the electrostatic attraction force P at the contact surface between the conductor unit 21a of the driving pulley 21 and the dielectric layer 23a of the belt 23 is described, the electrostatic attraction force P is also produced by the same principle at the contact surface of the conductor unit 21c of the driving pulley 21 and the dielectric layer 23a of the belt 23. Furthermore, the electrostatic attraction force P is produced on the contact surface of the conductor unit 22a of the driven pulley 22 and the dielectric layer 23a of the belt 23 according to the same principle. Furthermore, the electrostatic attraction force P is produced on the contact surface of the conductor unit 22c of the driven pulley 22 and the dielectric layer 23a of the belt 23 according to the same principle. The power that can be transmitted according to the electrostatic attraction force P is calculated by Equation (9) being substituted into Equation (5).

Durability of the belt 23 further improves by employing the low-resistance layer 23c in place of the conductor unit 23b in this way. A metal layer such as the conductor unit 23b can crack due to metal fatigue causing the electrostatic attraction force P to fluctuate. Durability of the belt 23 improves because the low-resistance layer 23c is relatively hard to crack and also a fluctuation of the electrostatic attraction force P is reduced. Other variations or effects relating to the second embodiment are shared with the first embodiment.

Third Embodiment

In a third embodiment, the configuration of the belt 23 of the power transmission apparatus 50 differs from the first embodiment. For this reason, description is given centering on the points of difference hereinafter. The same reference numerals are given to configuration elements that are the same or to configuration elements that are similar to those already described, and description of these is omitted.

Figure 6:
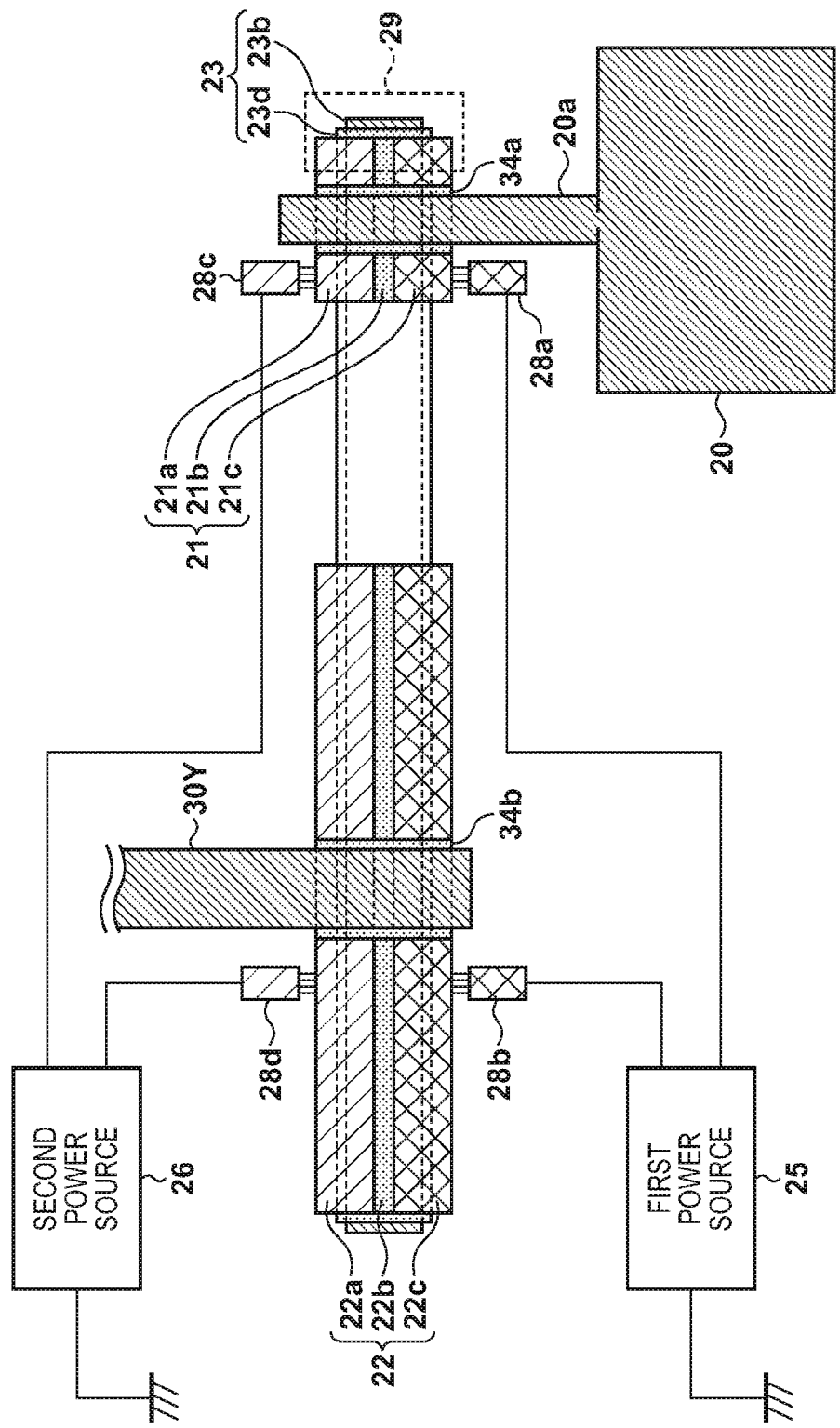
FIG. 6 is a cross-sectional view of the power transmission apparatus of a third embodiment.
Figure 7:
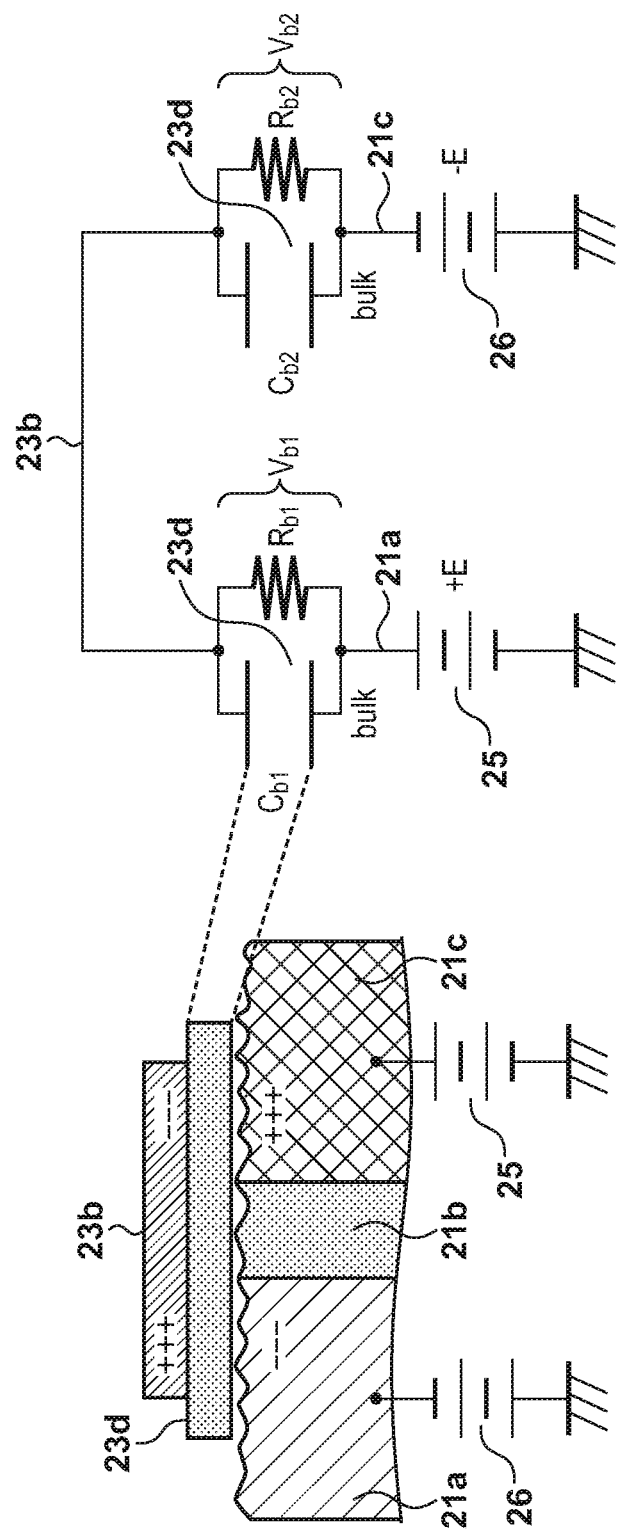
FIG. 7 is a view for describing an equivalent circuit of the power transmission apparatus.

FIG. 6 is a schematic cross-sectional view of the power transmission apparatus 50. FIG. 7 illustrates a cross-section of the driving pulley 21 and the belt 23 in the dashed line box 29 illustrated in FIG. 6 and an equivalent circuit thereof. The conductor unit 23b is arranged on the outer circumferential surface of the dielectric layer 23a of the belt 23 as illustrated in FIG. 2 and FIG. 3A in the first embodiment. In contrast to this, an insulating layer 23d is arranged on the inner circumferential surface of the belt 23 as illustrated in FIG. 6 and FIG. 7 in the third embodiment. In other words, the insulating layer 23d is arranged in place of the dielectric layer 23a.

The equivalent circuit indicating electrical properties of the power transmission apparatus 50 becomes the equivalent circuit that FIG. 7 illustrates by the insulating layer 23d being arranged on the inner circumferential surface of the belt 23. The material of the insulating layer 23d is a polyimide resin material. The volume resistivity of the insulating layer 23d is larger than 1E+14 [Ω·m], for example, greater than or equal to 1E+15 [Ω·m]. The thickness of the insulating layer 23d is approximately 70 μm. The width of the insulating layer 23d is approximately 10 μm. The width of the insulating layer 23d is wider than the width of the conductor unit 23b and discharge is suppressed.

Electrostatic Attraction Force

Cb1 and Cb2 are the static capacitances of the insulating layer 23d in the equivalent circuit in the third embodiment. Rb1 and Rb2 are resistances of the insulating layer 23d.

When voltages are applied to the conductor unit 21a and the conductor unit 21c of the driving pulley 21 respectively, charges differing in polarity are respectively induced at the boundary of the insulating layer 23d facing the conductor unit 23b and the boundary of the insulating layer 23d facing the conductor unit 21a as FIG. 7 illustrates. An electrostatic attraction force occurs due to these positive/negative charges. This attraction force is a Coulomb force.

The electrostatic attraction force P per unit area in FIG. 7 is represented by Equation (10). The charge per unit area Qb1 induced in both the conductor unit 21a and the conductor unit 23b is represented by Equation (10). The charge Qb1 is determined by the static capacitances Cb1 and Cb2 of the insulating layer 23d as Equation (10) illustrates. Equation (12) is obtained when Equation (11) is substituted into Equation (10)

$$P = \frac{Q_{b1}^2}{2\varepsilon_0} \tag{10}$$

$$Q_{b1} = \frac{C_{b1}C_{b2}}{C_{b1}+C_{b2}} 2E \tag{11}$$

$$P = \frac{1}{2\varepsilon_0} \cdot \left(\frac{C_{b1}C_{b2}}{C_{b1}+C_{b2}} 2E\right)^2 \tag{12}$$

It can be seen from Equation (12) that the electrostatic attraction force P is determined by the applied voltage E and the static capacitances Cb1 and Cb2 of the insulating layer 23d of the belt 23.

In the foregoing, the electrostatic attraction force P produced between the conductor unit 21a of the driving pulley 21 and the conductor unit 23b of the belt 23 is described. The electrostatic attraction force P that occurs between the conductor unit 21c of the driving pulley 21 and the conductor unit 23b of the belt 23 is also based on the same principle. Furthermore, the electrostatic attraction force P is produced between the conductor unit 22a of the driven pulley 22 and the conductor unit 23b of the belt based on the same principle. Furthermore, the electrostatic attraction force P is produced between the conductor unit 22c of the driven pulley 22 and the conductor unit 23b of the belt based on the same principle. The power that can be transmitted according to the electrostatic attraction force P is calculated by Equation (12) being substituted into Equation (5).

The Coulomb force is employed as the electrostatic attraction force in the third embodiment. For this reason, even if the roughness of the surface of the belt 23 and the roughness of the surface of the pulley both change due to wear, the electrostatic attraction force does not decrease. Thus, a more stable electrostatic attraction force can be produced. Other variations or effects relating to the third embodiment are shared with the first embodiment.

Fourth Embodiment

A fourth embodiment is different in that the dielectric layer arranged on the inner circumferential surface of the belt 23 of the power transmission apparatus 50 is arranged on the outer circumferential surface of the driving pulley 21 and the driven pulley 22 in contrast to the first embodiment. For this reason, description is given centering on the points of difference hereinafter. The same reference numerals are given to configuration elements that are the same or to configuration elements that are similar to those already described, and description of these is omitted.

Figure 8:
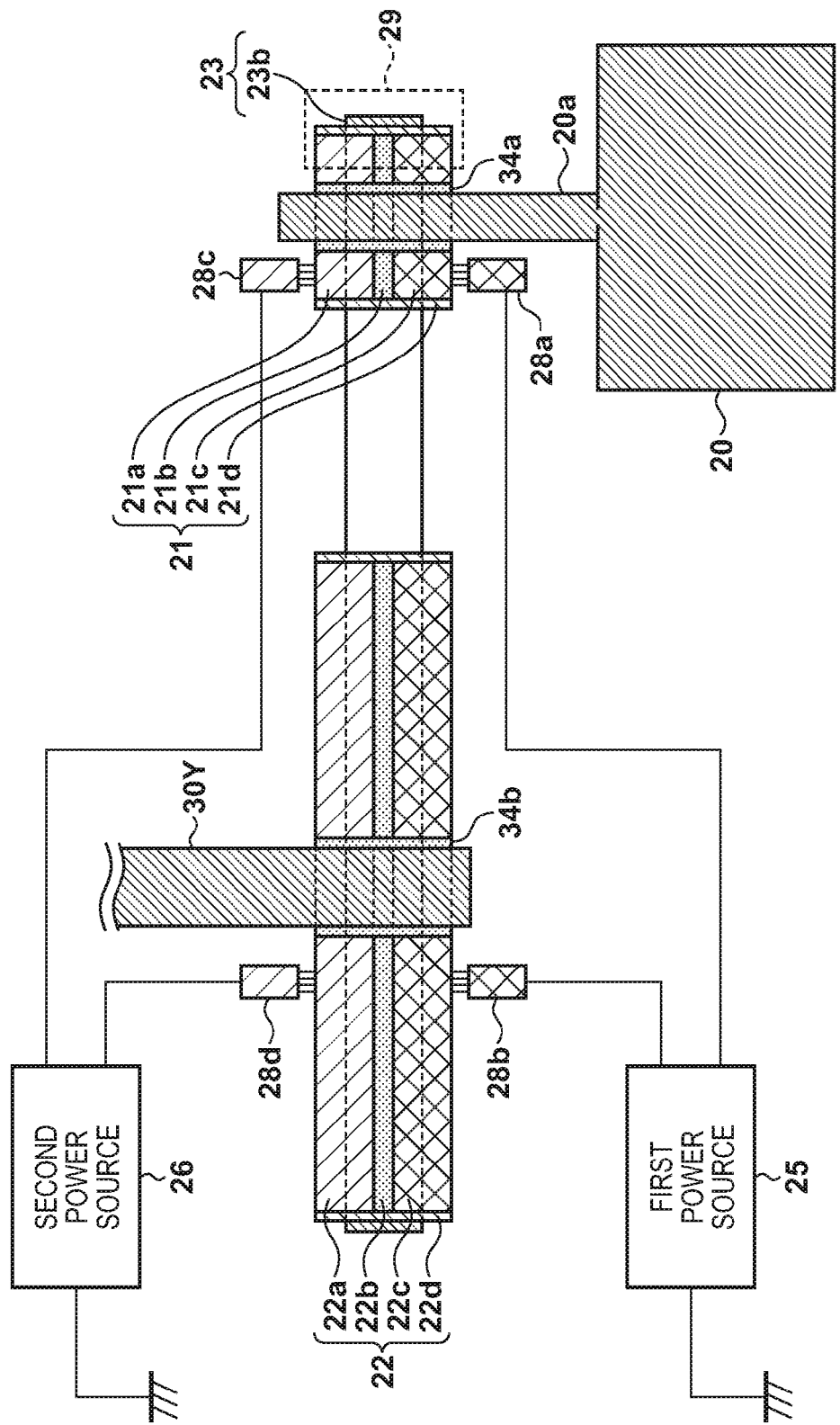
FIG. 8 is a cross-sectional view of the power transmission apparatus of a fourth embodiment.
Figure 9:
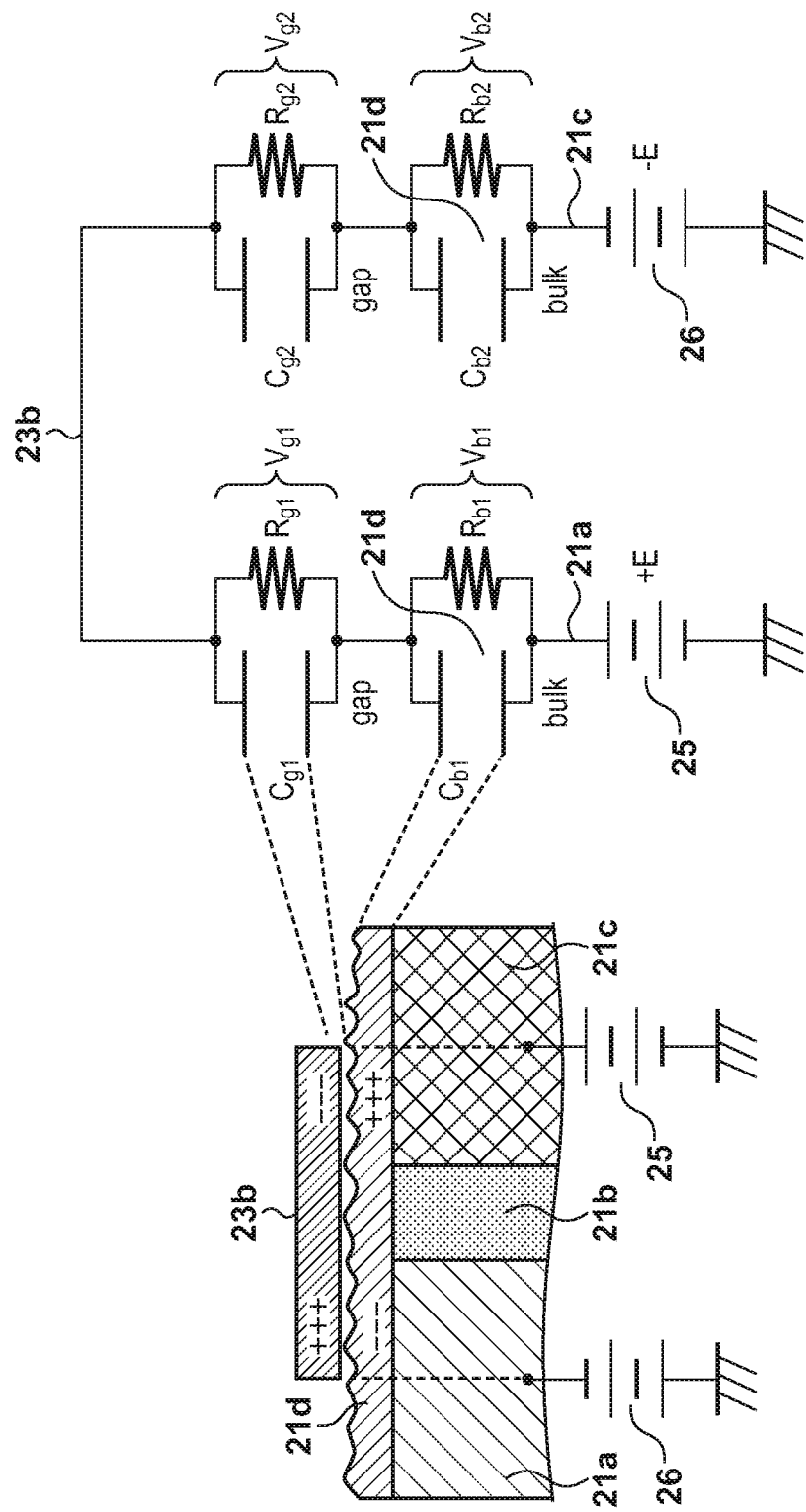
FIG. 9 is a view for describing an equivalent circuit of the power transmission apparatus.

FIG. 8 is a schematic cross-sectional view of the power transmission apparatus 50. FIG. 9 illustrates a cross-section of the driving pulley 21 and the belt 23 in the dashed line box 29 illustrated in FIG. 8 and an equivalent circuit thereof. A dielectric layer 21d arranged on the outer circumferential surface of the driving pulley 21 and a dielectric layer 22d arranged on the outer circumferential surface of the driven pulley 22 are configured by a polyimide resin material in which conductive carbon is dispersed. A volume resistivity of the dielectric layers 21d and 22d is greater than or equal to 1E+9 [Ω·m] and less than or equal to 1E+14 [Ω·m]. The thickness of the dielectric layers 21d and 22d is approximately 70 μm and the width is approximately 10 mm.

Electrostatic Attraction Force

As FIG. 9 illustrates, a minute unevenness exists on the surface of the driving pulley 21 and the surface of the belt 23 respectively. Accordingly, a minute gap is formed between the driving pulley 21 and the belt 23. The contact state between the driving pulley 21 and the belt 23 is represented by the equivalent circuit as FIG. 9 illustrates electrically. Here, Cb1 indicates a static capacitance of the dielectric layer 21d. Rb1 is a resistance of the dielectric layer 21d. Cg1 indicates a static capacitance of the gap formed by the conductor unit 21a and the belt 23 of the driving pulley 21. Rg1 is a contact resistance the belt 23 of the driving pulley 21. Cb2 is the static capacitance of the dielectric layer 21d. Rb2 is a resistance of the dielectric layer 21d. Cg2 indicates a static capacitance of the gap formed by the conductor unit 21c and the belt 23 of the driving pulley 21. Rg2 indicates a contact resistance of the conductor unit 21c of the driving pulley 21 and the belt 23.

A large voltage drop occurs locally due to the contact resistance of a contact point between the dielectric layer 21d and the conductor unit 23b when a voltage is applied to the conductor unit 21a and the conductor unit 21c of the driving pulley 21. The voltage drops are Vg1 and Vg2. As FIG. 9 illustrates, charges differing in polarity are induced at the contact surface of the dielectric layer 21d on the driving pulley 21 and the contact surface of the conductor unit 23b of the belt 23. A large attraction force is produced because a tremendously large electric field occurs in the gap. This attraction force is a Johnsen-Rahbek force. A method of calculating the electrostatic attraction force and power that can be transmitted in the fourth embodiment is the same as in the first embodiment.

Variations or effects relating to the fourth embodiment are basically the same as in the first embodiment. Furthermore, the conductor unit 23b of the belt 23 may be replaced with the low-resistance layer 23c as in the second embodiment. The dielectric layers 21d and 22d arranged on each pulley may be replaced with an insulating layer as in the third embodiment.

Fifth Embodiment

In the fifth embodiment, an arrangement between the conductor unit and the insulating layer arranged on each pulley of the power transmission apparatus 50 are different to the first embodiment. For this reason, description is given centering on the points of difference hereinafter. The same reference numerals are given to configuration elements that are the same or to configuration elements that are similar to those already described, and description of these is omitted.

Figure 10:
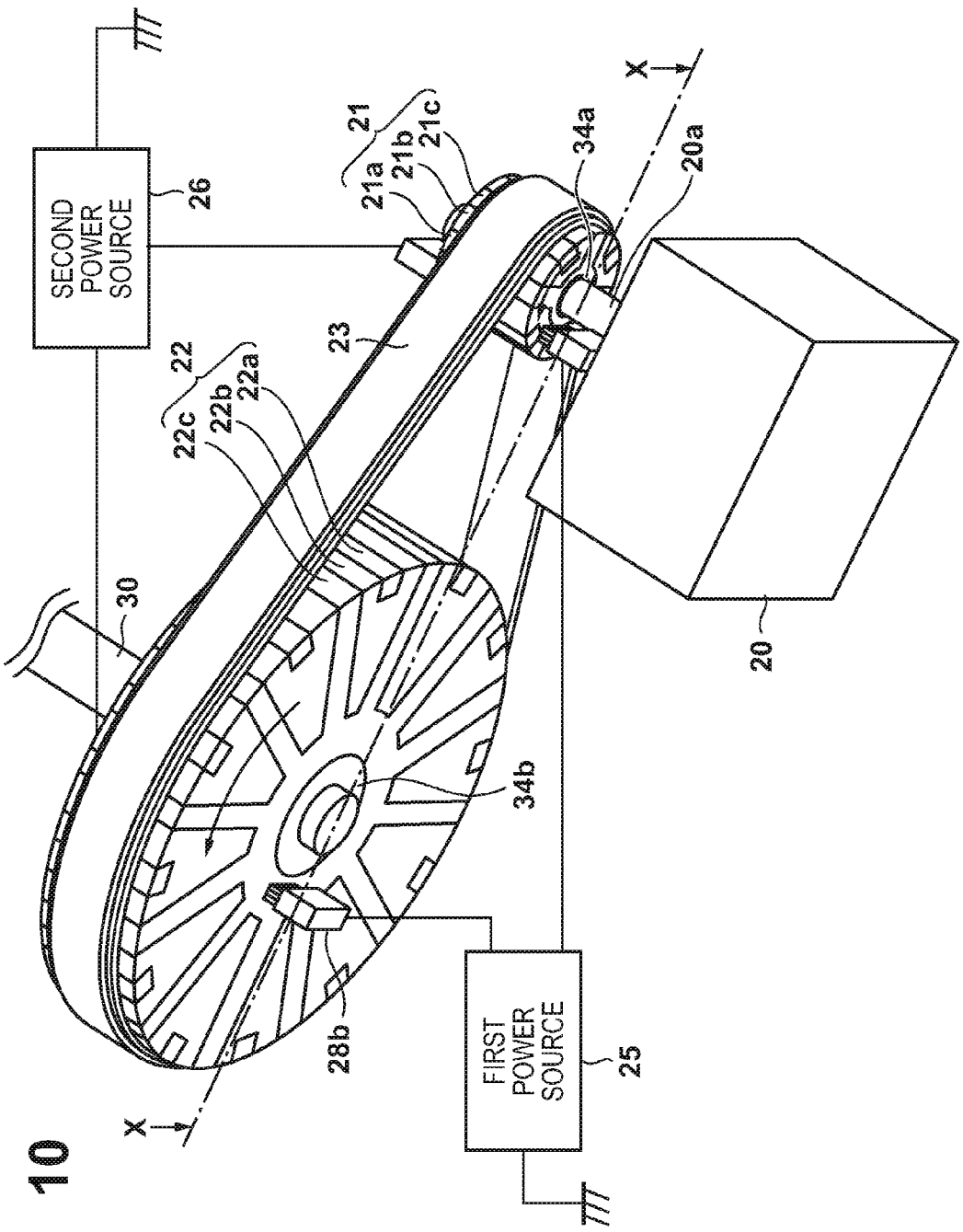
FIG. 10 is a perspective view of a power transmission apparatus according to a fifth embodiment.
Figure 11:
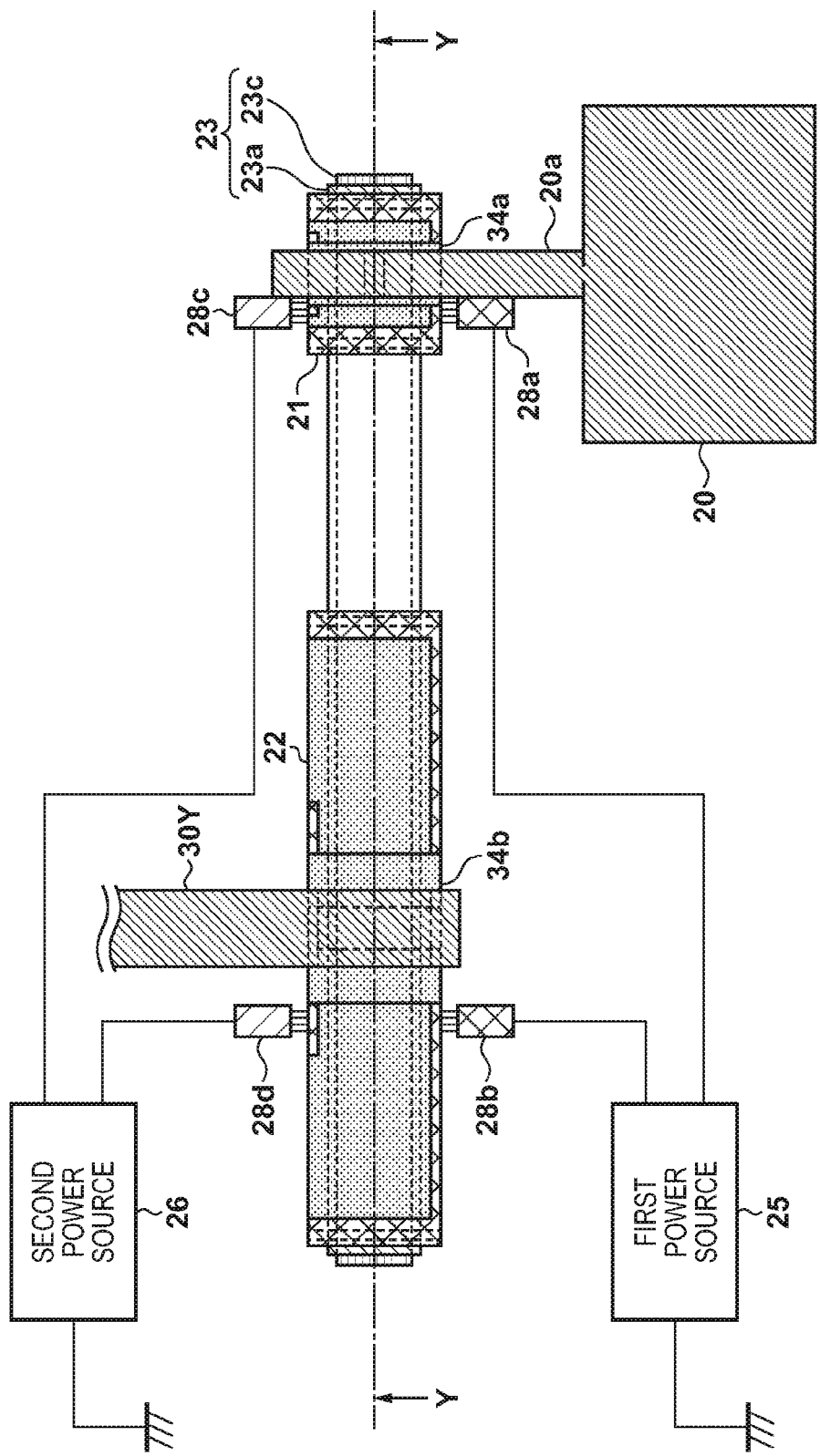
FIG. 11 is a view illustrating an X-X cross-section.
Figure 12:
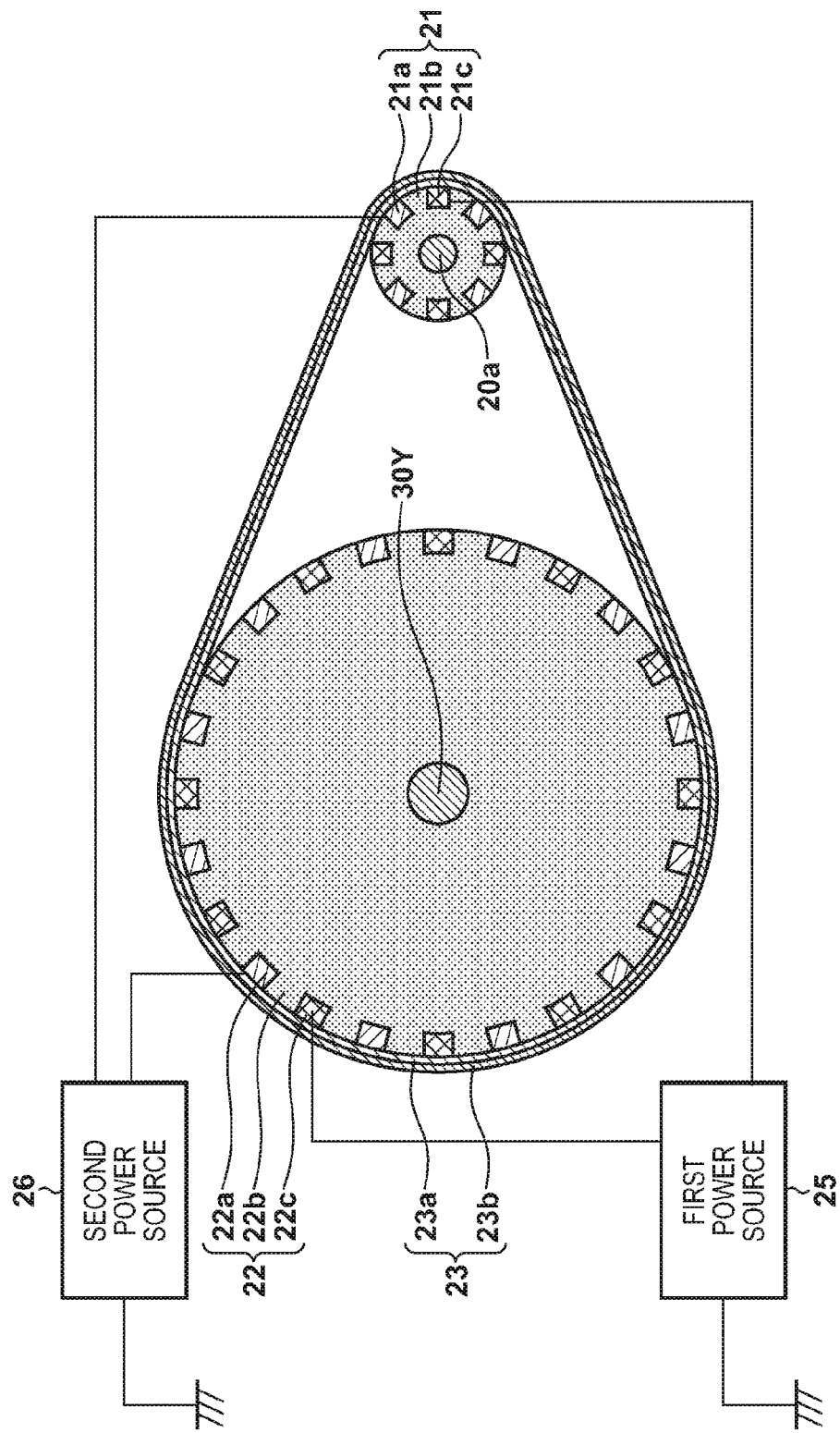
FIG. 12 is a view illustrating an Y-Y cross-section.

FIG. 10 is a perspective view of the power transmission apparatus 50. FIG. 11 illustrates an X-X cross-section illustrated in FIG. 10. FIG. 12 illustrates an Y-Y cross-section illustrated in FIG. 11. In the first embodiment, each pulley is configured by a disc-form conductor unit and insulating layer. In the fifth embodiment, two conductor units arranged on each pulley have tooth-like portions as FIG. 10 and FIG. 12 illustrate. An insulating layer is arranged between teeth of one conductor unit and teeth of another conductor unit.

The conductor unit 22a and the conductor unit 22c of the driven pulley 22 both have teeth portions as FIG. 10 and FIG. 12 illustrate. The teeth of the conductor unit 22a and the teeth of the conductor unit 22c are alternately arranged on the circumferential surface of the driven pulley 22. In other words, two teeth of the conductor unit 22c are adjacent to one tooth on the conductor unit 22a. Similarly, one tooth of the conductor unit 22c is adjacent to two teeth on the conductor unit 22a. The lengthwise direction of each tooth is parallel to the rotating shaft 30. The widthwise direction of each tooth is a direction following the contact surface (outer circumferential surface) of the belt of the pulley and is a direction orthogonal to the rotating shaft 30.

The conductor unit 22c has a donut shaped electrode unit that touches a conductive brush 28b as FIG. 10 illustrates. The conductive brush 28b can continuously apply a voltage to the conductor unit 22c during one rotation of the driven pulley 22 because the electrode unit is circular. Connection portions is arranged extending radially from the electrode unit between the electrode unit and the teeth. In this way, the conductor unit 22c has the electrode unit, the connection portions, and the teeth. The conductor unit 22a is the exact same shape as the conductor unit 22c. The conductor unit 22a and the conductor unit 22c can be manufactured as a single part leading to a decrease of manufacturing costs.

The driving pulley 21 also employs the same construction as the driven pulley 22. The teeth of the conductor unit 21a and the teeth of the conductor unit 21c are alternately arranged on the outer circumferential surface of the driving pulley 21 via the insulating layer 21b. In this way, the conductor unit 21a and the conductor unit 21c have the electrode unit, the connection portions, and the teeth. A direct-current voltage is applied from the first power source 25 via the conductive brush 28a to the electrode unit of the conductor unit 21c. A direct-current voltage is applied from the second power source 26 via the conductive brush 28c to the electrode unit of the conductor unit 21a.

The conductor unit 21a and the conductor unit 21c of the driving pulley 21 and the conductor unit 22a and the conductor unit 22c of the driven pulley 22 respectively have a conductor unit width and an insulating layer width (length of the arc following the rotation direction) of approximately 1 mm in the outer circumferential surface of the pulley formed in metal sputtering. The equivalent circuit representing electrical properties of the power transmission apparatus 50 is the same as in the first embodiment.

Figure 13:
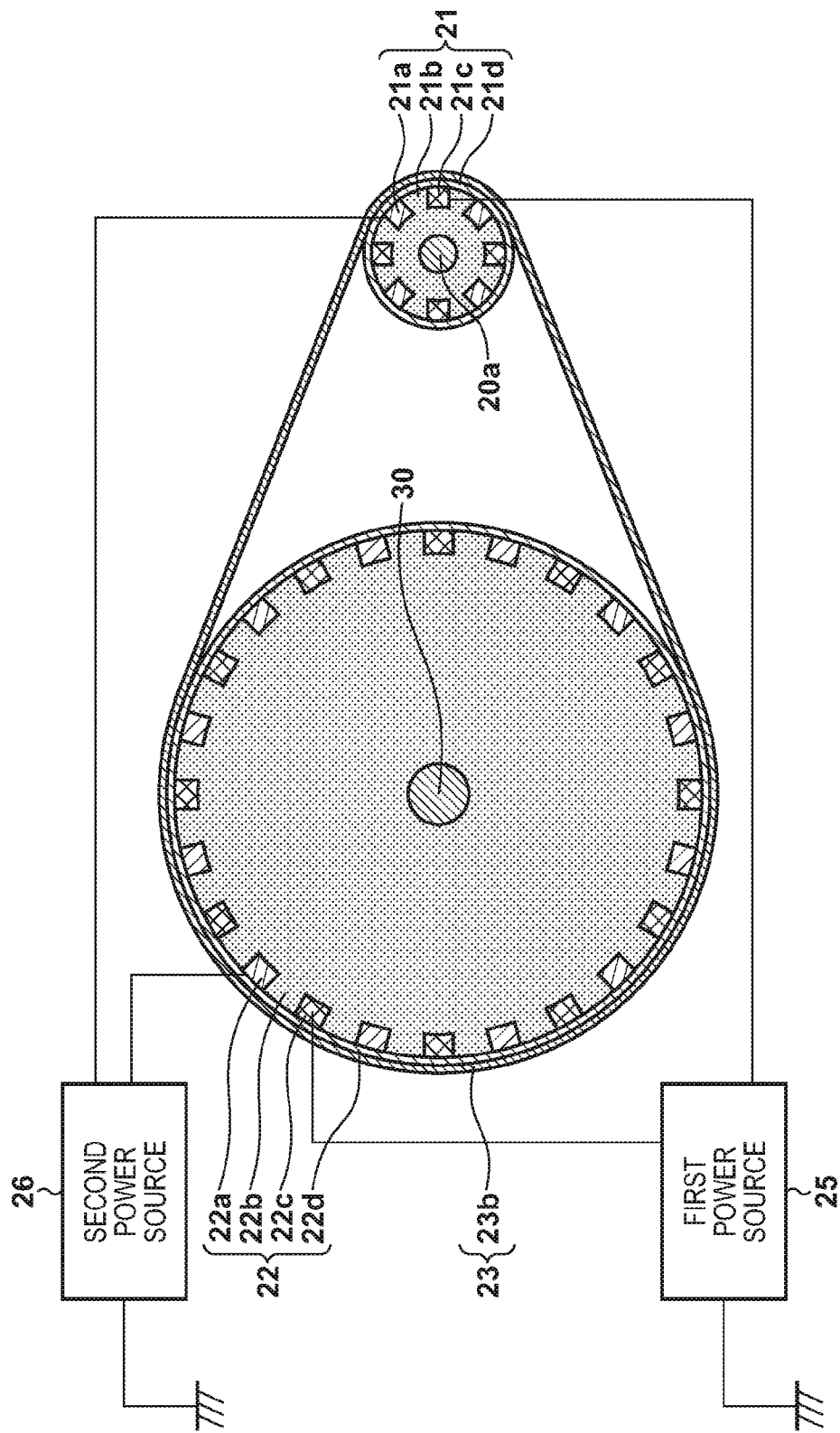
FIG. 13 is a cross-sectional view of a variation of the power transmission apparatus.

Variations and effects of the fifth embodiment are similar to the variations and effects described relating to another embodiment. For example, a dielectric layer may be further added to the outer circumference side of the conductor unit 23b of the belt 23. The conductor unit 23b of the belt 23 may be replaced with the low-resistance layer 23c as in the second embodiment. The dielectric layer 23a formed on the inner circumferential surface side of the belt 23 may be replaced with the insulating layer 23d as in the third embodiment. The belt 23 may be formed by the conductor unit 23b as FIG. 13 illustrates. In such a case, the dielectric layer 21d is arranged on the outer circumferential surface of the driving pulley 21, and the dielectric layer 22d is also arranged on the outer circumferential surface of the driven pulley 22.

Sixth Embodiment

Although the number of the driven pulleys 22 is one in the first to fifth embodiments, the number of the driven pulleys 22 may also be greater than or equal to two. A sixth embodiment is an example in which two driven pulleys are arranged.

Figure 14:
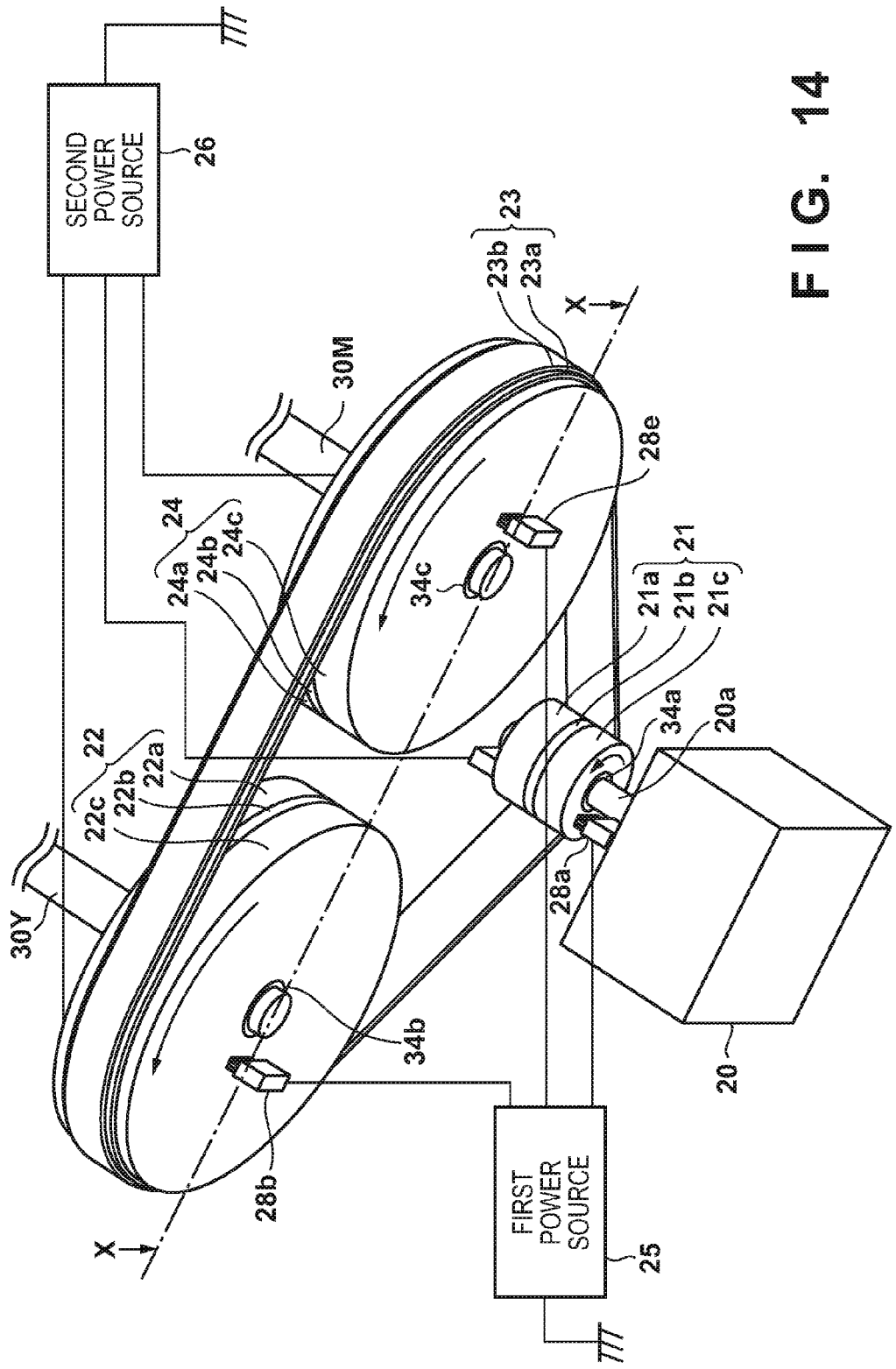
FIG. 14 is a perspective view of a power transmission apparatus according to a sixth embodiment.

FIG. 14 is a perspective view of the power transmission apparatus 50 according to the sixth embodiment. The belt 23 is stretched over the driving pulley 21, the driven pulley 22, and a driven pulley 24 as FIG. 14 illustrates. The configuration of the driven pulley 22 and the configuration of the driven pulley 24 are the same. The driving pulley 21 is driven by the motor 20 and rotates thereby. The driving pulley 21 causes the belt 23 to rotate. The belt 23 causes the driven pulleys 22 and 24 to rotate. A rotating shaft 30Y of the driven pulley 22 is coupled with a photosensitive drum that carries a yellow toner image for example. A rotating shaft 30M of the driven pulley 24 is coupled with a photosensitive drum that carries a magenta toner image for example. The driving force that the motor 20 generates is transmitted to a plurality of pulleys in this way.

Figure 15:
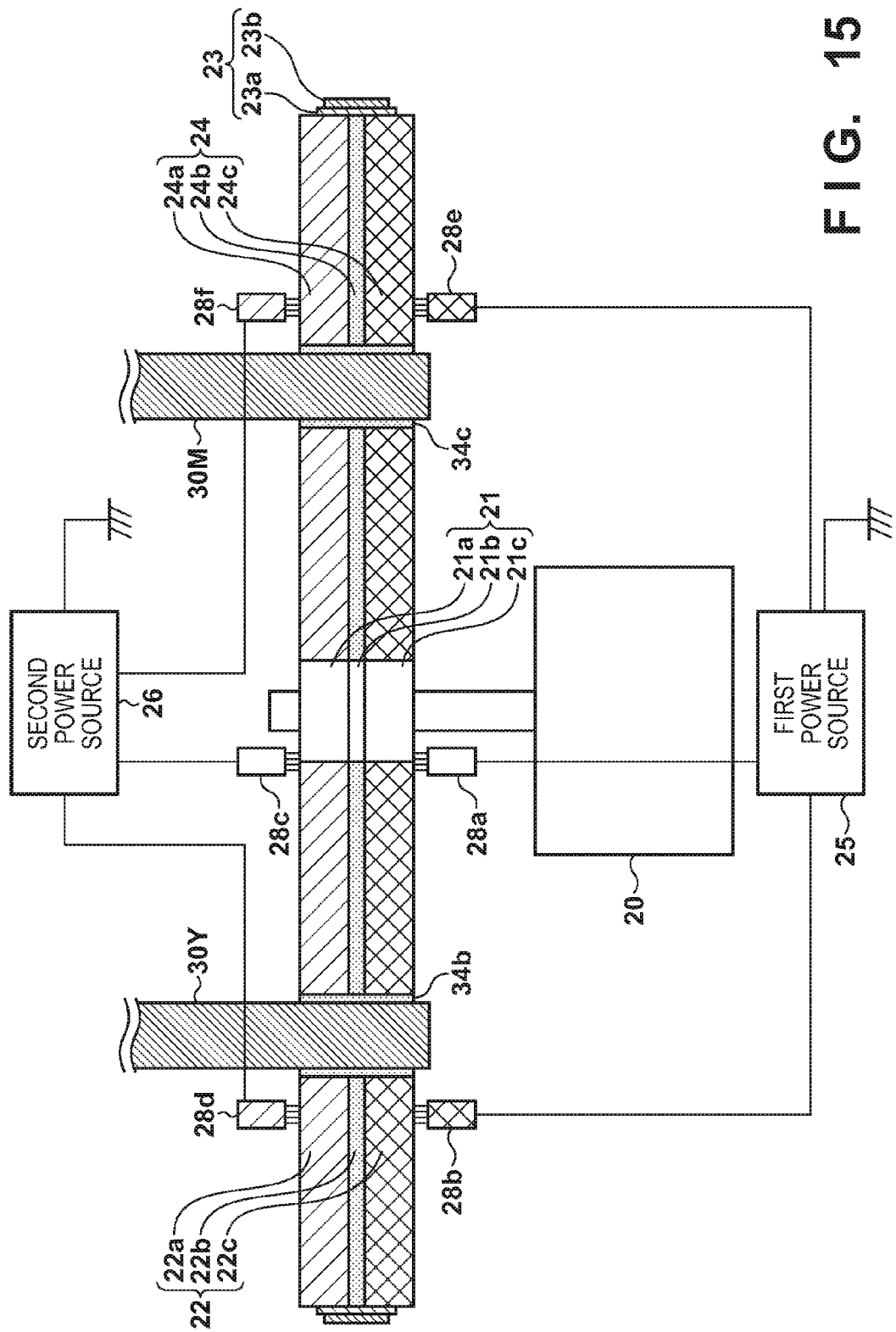
FIG. 15 is an X-X cross-sectional view.

FIG. 15 illustrates an X-X cross-section in FIG. 14. The basic configurations of the belt 23, the driving pulley 21, and the driven pulleys 22 and 24 are the same as the belt 23, the driving pulley 21, and the driven pulley 22 illustrated in the first embodiment. The first power source 25 applies a voltage to a conductor unit 24c of the driven pulley 24 via a conductive brush 28e as FIG. 14 and FIG. 15 illustrate. The second power source 26 via a conductive brush 28f applies a voltage to the conductor unit 24a of the driven pulley 24. An insulating layer 24b is arranged between the conductor unit 24c and the conductor unit 24a. Similarly to the driven pulley 22, an electrostatic attraction force is also produced between the belt 23 and the driven pulley 24 in which the insulating member 34c is arranged and between a rotating shaft 30M and the conductor unit 24a in addition to between the rotating shaft 30M and the conductor unit 24c.

A variation and effect of the sixth embodiment are similar to the variation and effect of the embodiment described thus far. For example, a dielectric layer may be further added to the outer circumferential surface of the conductor unit 23b of the belt 23. The conductor unit 23b of the belt 23 may be replaced with the low-resistance layer 23c. The dielectric layer 23a formed on the inner circumferential surface of the belt 23 may be replaced with an insulating layer. A dielectric layer may be formed on each outer circumferential surface of the driving pulley 21, the driven pulley 22, and the driven pulley 24 in place of arranging the dielectric layer 23a in the belt 23. The fifth embodiment may be applied to the driven pulley 24.

Seventh Embodiment

Figure 16:
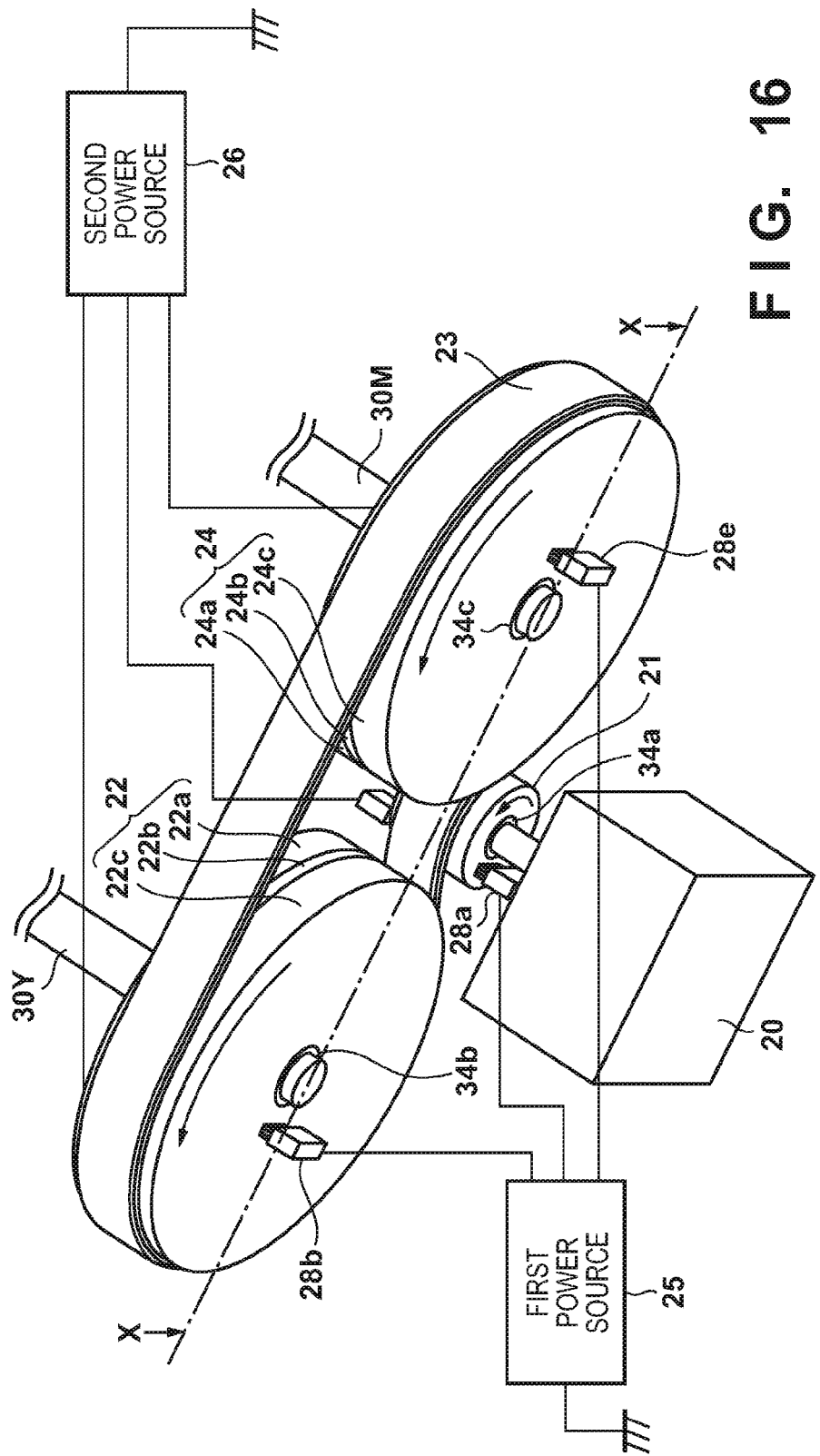
FIG. 16 is a perspective view of a power transmission apparatus according to a seventh embodiment.
Figure 17:
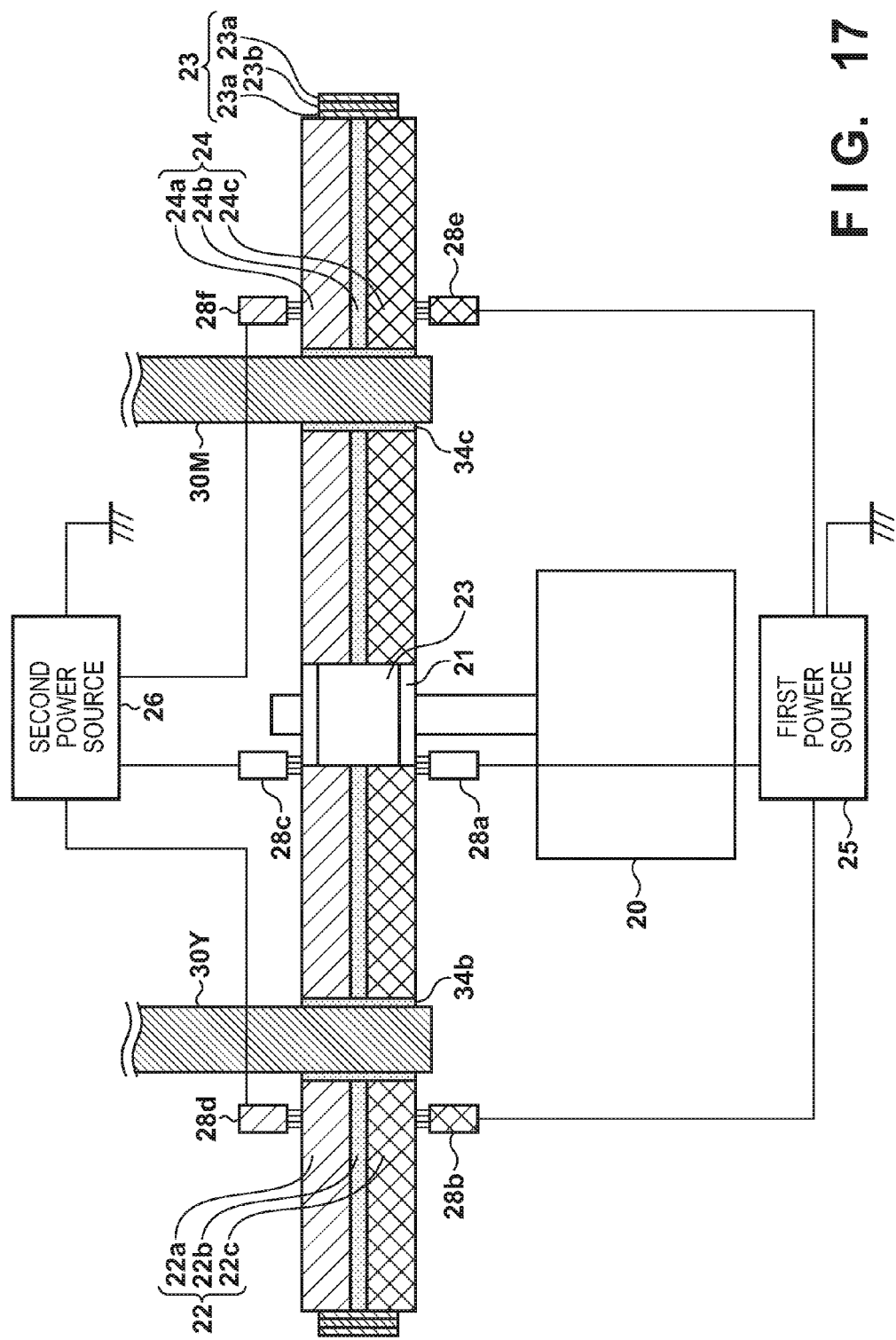
FIG. 17 is an X-X cross-sectional view.

Every pulley is arranged on the inside of the belt 23 in the first to sixth embodiments. However, some pulleys may be arranged on the outside of the belt 23 as FIG. 16 exemplifies. FIG. 16 is a perspective view of the power transmission apparatus 50 according to the seventh embodiment. FIG. 17 illustrates an X-X cross-section in FIG. 16. A seventh embodiment is different to the sixth embodiment in that the driving pulley 21 is arranged on the outside of the belt 23. As FIG. 17 illustrates, the dielectric layer 23a is also arranged on the outside of the conductor unit 23b rather than only on the inside of the conductor unit 23b of the belt 23. Other configurations are the same as in the sixth embodiment. Additionally, a variation and effect of the seventh embodiment are similar to the variation and effect of the embodiment described thus far.

<Image Forming Apparatus>

Figure 18:
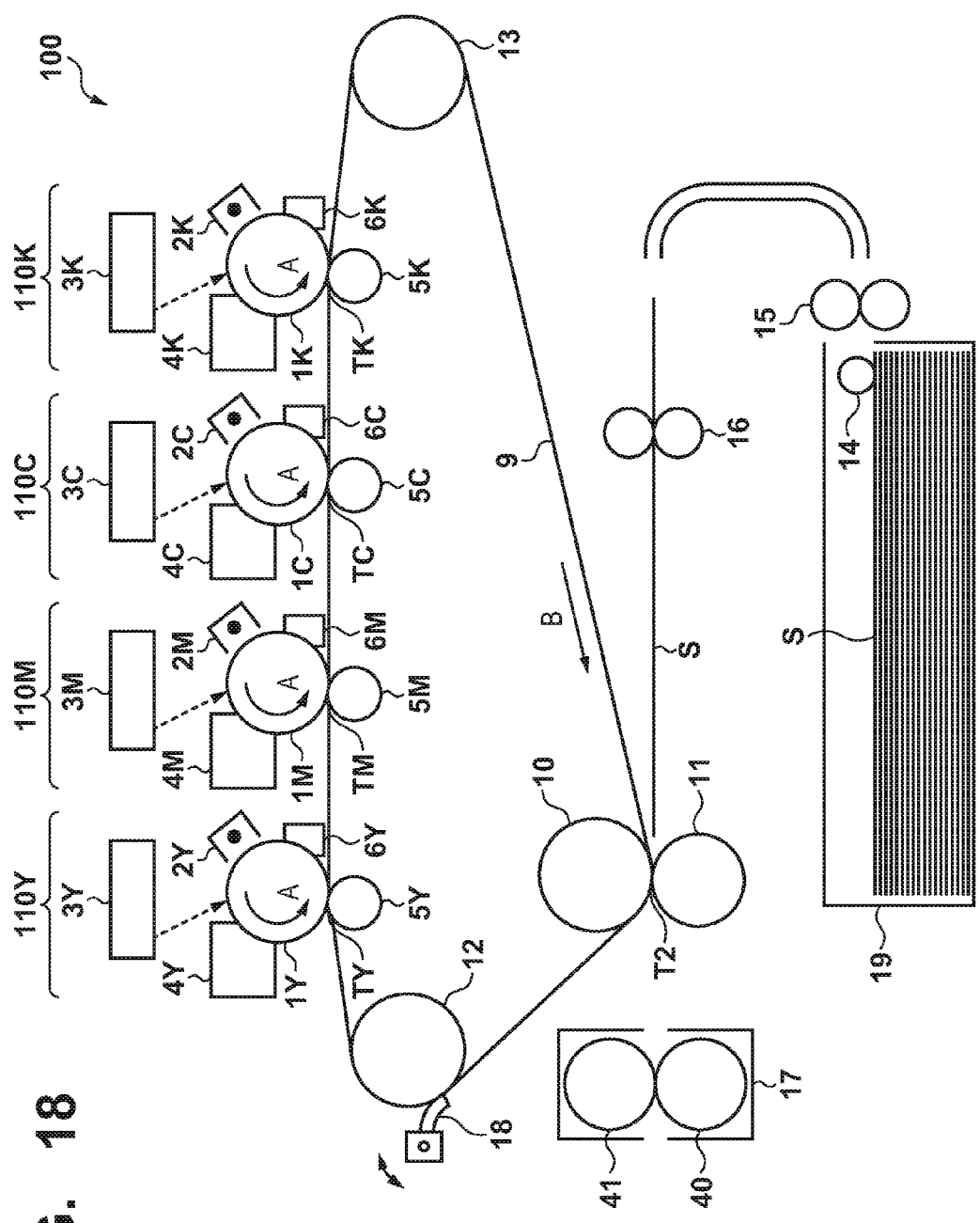
FIG. 18 is a view for describing a configuration of an image forming apparatus.

Below, an image forming apparatus is described as an application of the power transmission apparatus 50 described above. FIG. 18 is a view illustrating a basic configuration of an image forming apparatus 100. Image forming units 110Y, 110M, 110C, and 110K for yellow, magenta, cyan, and black are arranged following the rotation direction (arrow symbol B) of an intermediate transfer belt 9. Because a configuration of the image forming units 110Y, 110M, 110C, and 110K is shared, the image forming unit 110Y is described as a representative of these. Although the characters of YMCK added to reference numerals represent yellow, magenta, cyan, and black, the characters YMCK are omitted when common items are described.

A charging apparatus 2 uniformly charges the surface of the photosensitive drum 1 in the image forming unit 110. An exposure unit 3 outputs a laser beam in accordance with inputted image information. The laser beam exposes the surface of the exposure unit 3 while scanning it and thereby forms an electrostatic latent image. A developing apparatus 4 develops the electrostatic latent image by using toner and thereby forms a toner image. A primary transfer roller 5 transfers the toner image to the intermediate transfer belt 9 at a primary transfer nip T. A drum cleaner 6 cleans the toner remaining on the surface of the photosensitive drum 1. The intermediate transfer belt 9 is stretched across and supported by a driving roller 13, a tension roller 12, and a backup roller 10. The intermediate transfer belt 9 rotates in the direction of the arrow symbol B together with the rotation of the driving roller 13. A toner image carried on the intermediate transfer belt 9 is conveyed to a secondary transfer unit T2 together with the rotation of the intermediate transfer belt 9.

A paper feed roller 14 feeds a sheet S from a paper feed cassette 19. A separating apparatus 15 separates a plurality of sheets S one at a time and feeds them to a registration roller 16. The registration roller 16 causes a timing at which the toner image carried on the intermediate transfer belt 9 reaches the secondary transfer unit T2 to align with a timing at which the sheet S reaches the secondary transfer unit T2. A secondary transfer roller 11 secondary transfers the toner image to the sheet S. The sheet S to which the toner image is secondary transferred is handed over to a fixing apparatus 17. The fixing apparatus 17 causes the toner image to be fixed to the sheet S by a pressure roller 40 and a fixing roller 41 applying heat and pressure to the toner image and the sheet S. A belt cleaner 18 cleans the toner remaining on the intermediate transfer belt 9.

The power transmission apparatus 50 can be employed to cause the various rotating bodies that the image forming apparatus 100 comprises to rotate. The photosensitive drum 1, the driving roller 13, the fixing roller 41, and the like exist as rotating bodies that rotate by power being transmitted by the power transmission apparatus 50. However, these are nothing more than examples, and it is possible to employ the driven body as long as it is a rotating body that is rotated by power supplied by the driven pulleys 22 and 24.

CONCLUSION

The motor 20 is one example of a driving source that generates power as described using FIG. 1. The driving pulley 21 is one example of a driving pulley that rotates by power generated by the motor 20 being transmitted. The belt 23 is one example of an endless belt that rotates by contacting the driving pulley 21. The driven pulleys 22 and 24 are one example of at least one driven pulley that rotates by contacting the belt 23. The first power source 25 is one example of a first power source that supplies a voltage to the driving pulley 21 in order to produce an electrostatic attraction force between the driving pulley 21 and the belt 23. The second power source 26 is one example of a second power source that supplies a voltage to the at least one driven pulley in order to produce an electrostatic attraction force between the at least one driven pulley and the belt 23. In this way, an electrostatic attraction force acts between the belt 23 and the driven pulleys 22 and 24 in addition to between the belt 23 and the driving pulley 21. Thus, power generated by the motor 20 is transmitted to the driven pulleys 22 and 24 efficiently.

At least one pulley among the driving pulley 21 and the at least one driven pulley has a first electrode to which a first voltage is applied and a second electrode that is insulated from the first electrode and to which a second voltage is applied, as FIG. 2 illustrates. The first electrode is the conductor units 21c and 22c for example, and the second electrode is the conductor units 21a and 22a. The belt 23 has the conductor unit 23b which functions as a conductor layer. The dielectric layer 23a is arranged as a first insulating layer between the conductor unit 23b of the belt 23 and the first electrode of the at least one pulley. Similarly, the dielectric layer 23a is arranged as a first insulating layer between the conductor unit 23b of the belt 23 and the second electrode of the at least one pulley. In this way, it is not necessary for an electrode to be arranged on the belt 23 by the first electrode and the second electrode being arranged on the pulley. In other words, it becomes unnecessary for a conductive brush to chafe the belt 23 and a chafing sound decreases.

The first electrode may have a disc-form first conductor (the conductor units 21c and 22c) that forms a first side surface of the at least one pulley as FIG. 1, FIG. 2, and the like, illustrate. Also, the second electrode may have a disc-form second conductor (the conductor units 21a and 22a) that forms a second side surface of the at least one pulley. An insulating body (the insulating layers 21b and 22b) is arranged between the first conductor and the second conductor in the at least one pulley. These may be useful in reducing manufacturing costs of a pulley because they can be the relatively easily to manufacture.

The first electrode may have a tooth-like first conductor (the conductor units 21c and 22c) and the second electrode may also have a tooth-like second conductor (the conductor units 21a and 22a) as FIG. 10 and the like illustrate. Also, an insulating body (the insulating layers 21b and 22b) is arranged between the first conductor and the second conductor. Note, teeth of the first conductor and teeth of the second conductor are alternately arranged on the contact surface (outer circumferential surface) of the at least one pulley that contacts the belt 23. By this, an electrostatic attraction force may be produced.

The first electrode (the conductor units 21c and 22c) may have a first power receiving unit, a first connection unit, and a tooth-like first conductor as FIG. 10 and the like illustrate. The first power receiving unit may be arranged on the first side surface of the at least one pulley and may also be a donut-shaped (ring-shaped) electrode unit that touches a first conductive brush (the conductive brushes 28b and 28a) that applies a first voltage. The first connection unit may extend radially from the donut-shaped electrode unit and may also be a conductive connection portion that connects the first power receiving unit and the tooth-like first conductor.

The second electrode (the conductor units 21a and 22a) may have a second power receiving unit, a second connection unit, and a tooth-like second conductor. The second power receiving unit may be arranged on the second side surface of the at least one pulley and may also be a donut-shaped electrode unit that touches a second conductive brush (the conductive brushes 28d and 28c) that applies a second voltage. The second connection unit may extend radially from the second power receiving unit and may also be a conductive connection portion that connects the second power receiving unit and the tooth-like second conductor.

The first insulating layer (the dielectric layer 23a) may be arranged on the contact surface of the belt 23 contacting the at least one pulley as FIG. 2, FIGS. 3A-3C, and the like, illustrate. The first insulating layer arranged on the belt 23 contacts the second electrode (the conductor units 21a and 22a) and the first electrode (the conductor units 21c and 22c) of the at least one pulley. By this, a Johnsen-Rahbek force acts as an attraction force.

The width of the first insulating layer (the dielectric layer 23a) arranged on the belt 23 is wider than the width of the conductor layer (the conductor unit 23b) of the belt 23. By this, an insulating distance becomes greater between the conductor unit of the pulley and the conductor unit of the belt 23, and a discharge tends not to be produced.

The first insulating layer (the insulating layer 23d and the dielectric layer 22d) may be arranged on the contact surface of the at least one pulley that contacts with the belt 23 as FIG. 7 and FIG. 13 illustrate. The first insulating layer arranged on the at least one pulley contacts with the conductor layer (the conductor unit 23b) of the belt 23. In this way, the insulating layer or the dielectric layer may be arranged on the pulley side or may be arranged on the belt side. The width of the first insulating layer (the insulating layer 23d) arranged on the at least one pulley is wider than the width of the conductor layer (the conductor unit 23b) of the belt 23, as FIG. 7 illustrates. By this, an insulating distance becomes greater between the conductor unit of the pulley and the conductor unit of the belt 23, and a discharge tends not to be produced.

The first insulating layer may be the dielectric layer 23a polarized by the potential difference between a first voltage applied to the first electrode and a second voltage applied to the second electrode as illustrated in FIG. 2, FIGS. 3A-3C, and the like. Note, the volume resistivity of the dielectric layer 23a is larger than the volume resistivity of the conductor layer (the conductor unit 23b) of the belt 23, larger than the volume resistivity of the first electrode (the conductor units 21c and 22c), and larger than the volume resistivity of the second electrode (the conductor units 21a and 22a). An electrostatic attraction force may be produced with good efficiency according to such conditions. A volume resistivity of the dielectric layer 23a may be greater than or equal to 1E+9 [Ω·m] and less than or equal to 1E+14 [Ω·m] for example. By this, the electrostatic attraction force becomes a Johnsen-Rahbek force. When the volume resistivity of the dielectric layer 23a is greater than 1E+14 [Ω·m], a Johnsen-Rahbek force is not produced and, in place of it, a Coulomb force becomes the electrostatic attraction force, as described in relation with FIG. 7. The conductor unit 23b arranged on the belt 23 may be a metal layer.

Both the driving pulley 21 and the at least one driven pulley may contact with the inner circumferential surface of the belt 23 as illustrated in FIG. 1 and FIG. 14. The at least one pulley out of the driving pulley 21 and the at least one driven pulley may contact with the outer circumferential surface of the belt 23 as illustrated in FIG. 16. The second insulating layer (the dielectric layer 23a) is arranged on the conductor unit 23b (outer circumferential surface side) of the belt 23 in order for the Johnsen-Rahbek force to be generated, as FIG. 17 illustrates.

Note, it is not necessary that an electrostatic attraction force be produced in both the driving pulley 21 and the driven pulley 22. For example, there are times when reduction of a chafing sound of the belt 23 is more desirable than power transmission efficiency. In such a case, an electrostatic attraction force may be caused to act on at least one pulley among the driving pulley 21 and the driven pulley 22. The configurations of the embodiments described above are employed as the configuration of a pulley in which an electrostatic attraction force is produced. For example, the conductor unit 23b is arranged as the conductor layer on the belt 23. The first electrode (the conductor units 21c and 22c) to which the first voltage is applied and the second electrode (the conductor units 21a and 22a) that is insulated from the first electrode and to which the second voltage is applied are arranged on the pulley. The insulating layer 21b and 22b are arranged as the insulating layers between the first electrode and the second electrode of the pulley. In particular, an insulating layer or a dielectric layer is arranged between the conductor unit 23b of the belt 23 and the first electrode (the conductor units 21c and 22c) of the pulley. Also, an insulating layer or a dielectric layer is arranged between the conductor unit 23b of the belt 23 and the second electrode (the conductor units 21a and 22a) of the pulley. By this, it becomes possible to omit the conductive brush which chafes the belt 23 because an electrostatic attraction force is produced. In other words, a chafing sound is decreased.

The power transmission apparatus 50 can be applied to the image forming apparatus 100. The photosensitive drum 1 is one example of an image carrier. The charging apparatus 2 is one example of a charging unit that causes the circumferential surface of the image carrier to uniformly charge. The exposure unit 3 is one example of an exposure unit that forms an electrostatic latent image by exposing the circumferential surface of the image carrier uniformly charged by the charging unit. The developing apparatus 4 is one example of a developer unit that develops an electrostatic latent image into a toner image by using toner. The primary transfer roller 5 and the secondary transfer roller 11 are examples of transfer units that transfer a toner image to a sheet S. The fixing apparatus 17 is one example of a fixing unit that causes the toner image to be fixed to the sheet S. The power transmission apparatus 50 may drive the photosensitive drum 1 and may drive the fixing roller of the fixing apparatus 17. Also, the power transmission apparatus 50 may drive the intermediate transfer belt 9. The driven pulley 22 which rotates by contacting the belt 23 may be coaxially coupled to the driving roller 13 which drives the intermediate transfer belt 9. In this way, efficiency of rotating bodies involving a forming of an image becomes good and rotational stability is achieved, an image formation position becomes more accurate, and an image scaling factor in a sub scanning direction becomes more accurate. The sub scanning direction is the same as the direction of the conveyance of an image and the sheet S.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-125913, filed Jun. 24, 2016 which is hereby incorporated by reference herein in its entirety.

What is claimed is:

1. A power transmission apparatus comprising:
   a first pulley rotationally driven by a driving unit;
   a second pulley;
   a belt extended around the first pulley and the second pulley; and
   a supply unit configured to supply a voltage such that the first pulley and the belt are electrostatically attracted to each other and that the second pulley and the belt are electrostatically attracted to each other, wherein
   the belt includes a conductor layer,
   at least one pulley among the first pulley and the second pulley includes a first electrode to which a first voltage is applied and a second electrode that is insulated from the first electrode and to which a second voltage is applied,
   an insulating layer or a dielectric layer is arranged between the conductor layer of the belt and the first electrode of the at least one pulley, and
   another insulating layer or another dielectric layer is arranged between the conductor layer of the belt and the second electrode of the at least one pulley.

2. The power transmission apparatus according to claim 1, wherein
   the supply unit includes
   a first power source configured to supply the first voltage to the first electrode, and
   a second power source configured to supply the second voltage to the second electrode.

3. The power transmission apparatus according to claim 2, wherein
   a first insulating layer is respectively arranged between the belt and the first electrode and between the belt and the second electrode.

4. The power transmission apparatus according to claim 3, wherein
the first electrode includes a disc-form first conductor configured to form a first side surface of the at least one pulley,
the second electrode includes a disc-form second conductor configured to form a second side surface of the at least one pulley, and
an insulating body is arranged between the first conductor and the second conductor in the at least one pulley.

5. The power transmission apparatus according to claim 3, wherein
the first electrode includes a tooth-like first conductor,
the second electrode includes a tooth-like second conductor,
an insulating body is arranged between the first conductor and the second conductor, and
teeth of the first conductor and teeth of the second conductor are alternately arranged on a contact surface of the at least one pulley that contacts the belt.

6. The power transmission apparatus according to claim 5, wherein
the first electrode is arranged on a first side surface of the at least one pulley and includes a donut-shaped first power receiving unit that touches a first conductive brush that applies the first voltage and a conductive first connection unit that connects with the first power receiving unit and the tooth-like first conductor, and
the second electrode is arranged on a second side surface of the at least one pulley and includes a donut-shaped second power receiving unit that touches a second conductive brush that applies the second voltage and a conductive second connection unit that connects with the second power receiving unit and the tooth-like second conductor.

7. The power transmission apparatus according to claim 3, wherein
the first insulating layer is arranged on a contact surface of the belt that contacts the at least one pulley, and the first insulating layer arranged on the belt contacts the first electrode and the second electrode of the at least one pulley.

8. The power transmission apparatus according to claim 7, wherein
a width of the first insulating layer arranged on the belt is wider than a width of the conductor layer of the belt.

9. The power transmission apparatus according to claim 3, wherein
the first insulating layer is arranged on a contact surface of the at least one pulley contacting the belt and the first insulating layer arranged on the at least one pulley contacts the conductor layer of the belt.

10. The power transmission apparatus according to claim 9, wherein
a width of the first insulating layer arranged on the at least one pulley is wider than a width of the conductor layer of the belt.

11. The power transmission apparatus according to claim 3, wherein
the first insulating layer is a dielectric layer polarized by a potential difference between the first voltage applied to the first electrode and the second voltage applied to the second electrode.

12. The power transmission apparatus according to claim 11, wherein
a volume resistivity of the dielectric layer is higher than a volume resistivity of the conductor layer of the belt, is higher than a volume resistivity of the first electrode, and is higher than a volume resistivity of the second electrode.

13. The power transmission apparatus according to claim 12, wherein
the volume resistivity of the dielectric layer is greater than or equal to $1E+9$ [$\Omega \cdot m$] and less than or equal to $1E+14$ [$\Omega \cdot m$].

14. The power transmission apparatus according to claim 12, wherein
the volume resistivity of the dielectric layer is greater than $1E+14$ [$\Omega \cdot m$].

15. The power transmission apparatus according to claim 3, wherein
the conductor layer arranged on the belt is a metal layer.

16. The power transmission apparatus according to claim 3, wherein
the conductor layer arranged on the belt is a low-resistance layer having a volume resistivity greater than or equal $1E+2$ [$\Omega \cdot m$] and less than or equal to $1E+8$ [$\Omega \cdot m$].

17. The power transmission apparatus according to claim 1, wherein
both the first pulley and the second pulley contact the inner circumferential surface of the belt.

18. The power transmission apparatus according to claim 1, wherein
at least one pulley among the first pulley and the second pulley contacts an outer circumferential surface of the belt and a second insulating layer is arranged on the conductor layer of the belt.

19. An image forming apparatus comprising:
an image carrier;
a power transmission apparatus configured to drive the image carrier;
a charging unit configured to uniformly charge a circumferential surface of the image carrier;
an exposure unit configured to form an electrostatic latent image by exposing the circumferential surface of the image carrier uniformly charged by the charging unit;
a developer unit configured to develop the electrostatic latent image into a toner image by using toner;
a transfer unit configured to transfer the toner image to a sheet; and
a fixing unit configured cause the toner image to be fixed to the sheet, wherein
the power transmission apparatus comprises:
a first pulley rotationally driven by a driving unit;
a second pulley;
a belt extended around the first pulley and the second pulley; and
a supply unit configured to supply a voltage such that the first pulley and the belt are electrostatically attracted to each other and that the second pulley and the belt are electrostatically attracted to each other,
the belt includes a conductor layer,
at least one pulley among the first pulley and the second pulley includes a first electrode to which a first voltage is applied and a second electrode that is insulated from the first electrode and to which a second voltage is applied, and
an insulating layer or a dielectric layer is arranged between the conductor layer of the belt and the first electrode of the at least one pulley, and
another insulating layer or another dielectric layer is arranged between the conductor layer of the belt and the second electrode of the at least one pulley.

20. An image forming apparatus comprising:

an image carrier;

a charging unit configured to uniformly charge a circumferential surface of the image carrier;

an exposure unit configured to form an electrostatic latent image by exposing the circumferential surface of the image carrier uniformly charged by the charging unit;

a developer unit configured to develop the electrostatic latent image into a toner image by using toner;

a primary transfer unit configured to transfer the toner image to an intermediate transfer belt; and a power transmission apparatus configured to drive the intermediate transfer belt;

a secondary transfer unit configured to transfer a toner image carried on the intermediate transfer belt to a sheet; and a fixing unit configured cause the toner image to be fixed to the sheet, wherein the power transmission apparatus comprises:

a first pulley rotationally driven by a driving unit;

a second pulley;

a belt extended around the first pulley and the second pulley; and a supply unit configured to supply a voltage such that the first pulley and the belt are electrostatically attracted to each other and that the second pulley and the belt are electrostatically attracted to each other, the belt includes a conductor layer, at least one pulley among the first pulley and the second pulley includes a first electrode to which a first voltage is applied and a second electrode that is insulated from the first electrode and to which a second voltage is applied, and an insulating layer or a dielectric layer is arranged between the conductor layer of the belt and the first electrode of the at least one pulley, and another insulating layer or another dielectric layer is arranged between the conductor layer of the belt and the second electrode of the at least one pulley.

* * * * *